US012586431B2

(12) United States Patent
Luongo et al.

(10) Patent No.: US 12,586,431 B2
(45) Date of Patent: Mar. 24, 2026

(54) SECURE ACCESS TO TRAILER CONNECTORS

(71) Applicant: TrailerPAS LLC, Palm Beach Gardens, FL (US)

(72) Inventors: John Luongo, Oceanside, NY (US); Kerry Madden, Stuart, FL (US); Jonathan Antovel, East Setauket, NY (US); Colleen Hendry, Woonsocket, RI (US)

(73) Assignee: TRAILERPAS LLC, Palm Beach Gardens, FL (US)

( * ) Notice: Subject to any disclaimer, the term of this patent is extended or adjusted under 35 U.S.C. 154(b) by 237 days.

(21) Appl. No.: 18/365,355

(22) Filed: Aug. 4, 2023

(65) Prior Publication Data

US 2024/0046724 A1 Feb. 8, 2024

Related U.S. Application Data

(60) Provisional application No. 63/395,202, filed on Aug. 4, 2022.

(51) Int. Cl.
*G07C 9/00* (2020.01)
*B60D 1/60* (2006.01)

(52) U.S. Cl.
CPC ......... *G07C 9/00896* (2013.01); *B60D 1/605* (2013.01); *G07C 9/00571* (2013.01); *G07C 2009/0092* (2013.01)

(58) Field of Classification Search
None
See application file for complete search history.

(56) References Cited

U.S. PATENT DOCUMENTS

| | | | | |
|---|---|---|---|---|
| 8,816,691 | B2 * | 8/2014 | Miller | ............. G01R 31/44 |
| | | | | 324/414 |
| 10,991,178 | B2 * | 4/2021 | Thompson | ........... B60Q 11/005 |
| 11,770,677 | B1 * | 9/2023 | Lesesky | ............... H04W 4/42 |
| | | | | 455/456.1 |
| 2021/0150834 | A1 * | 5/2021 | Bates | ............. E05B 47/0607 |
| 2025/0078016 | A1 * | 3/2025 | Shipp | ............. H04W 64/003 |

FOREIGN PATENT DOCUMENTS

| | | | | |
|---|---|---|---|---|
| GB | 254582 | A * | 7/1926 | ............. H04R 13/02 |

* cited by examiner

*Primary Examiner* — K. Wong
(74) *Attorney, Agent, or Firm* — Carter, DeLuca & Farrell LLP

(57) ABSTRACT

An apparatus for providing secure access to a trailer connector includes: a cover, a locking device, and a controller. The cover is configured to be secured to a trailer and to cover at least one connector of the trailer. The cover has an open position in which the connector(s) are accessible and a closed position in which the connector(s) are inaccessible. The locking device has a first state configured to hold the cover in the closed position and a second state configured to permit the cover to move from the closed position to the open position. The controller is configured to cause the locking device to change from the first state to the second state, to permit the cover to move from the closed position to the open position, based on an authorization.

19 Claims, 21 Drawing Sheets

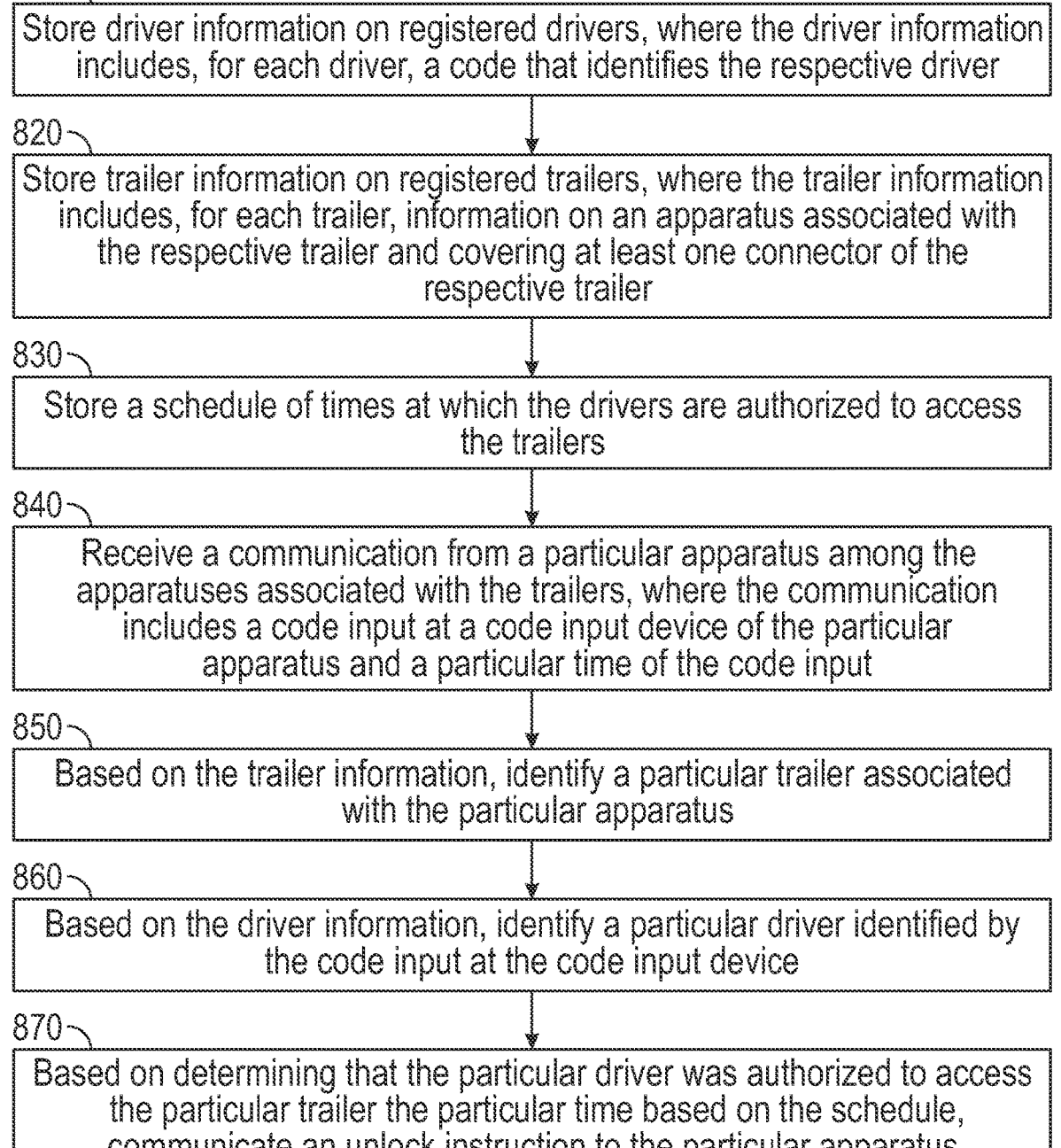

810
Store driver information on registered drivers, where the driver information includes, for each driver, a code that identifies the respective driver 820
Store trailer information on registered trailers, where the trailer information includes, for each trailer, information on an apparatus associated with the respective trailer and covering at least one connector of the respective trailer 830
Store a schedule of times at which the drivers are authorized to access the trailers 840
Receive a communication from a particular apparatus among the apparatuses associated with the trailers, where the communication includes a code input at a code input device of the particular apparatus and a particular time of the code input 850
Based on the trailer information, identify a particular trailer associated with the particular apparatus 860
Based on the driver information, identify a particular driver identified by the code input at the code input device 870
Based on determining that the particular driver was authorized to access the particular trailer the particular time based on the schedule, communicate an unlock instruction to the particular apparatus

FIG.8

| Trailer | Temperature | Status |
|---|---|---|
| A000001345 | 37°F | Ok |
| A000002872 | 38°F | Ok |
| C000000055 | 37°F | Ok |
| D000016752 | 36°F | Ok |
| E000000297 | 38°F | Ok |
| F000005246 | 37°F | Ok |
| M000000016 | 44°F | Alerted Driver |
| W000000145 | 38°F | Ok |

1110

DASHBOARD
COMPANIES
SITES
DRIVERS
REPORTS
MESSAGES
FORMS
USERS
TICKERS
QR CODE SCAN
Logged in as Admin

FIG. 11

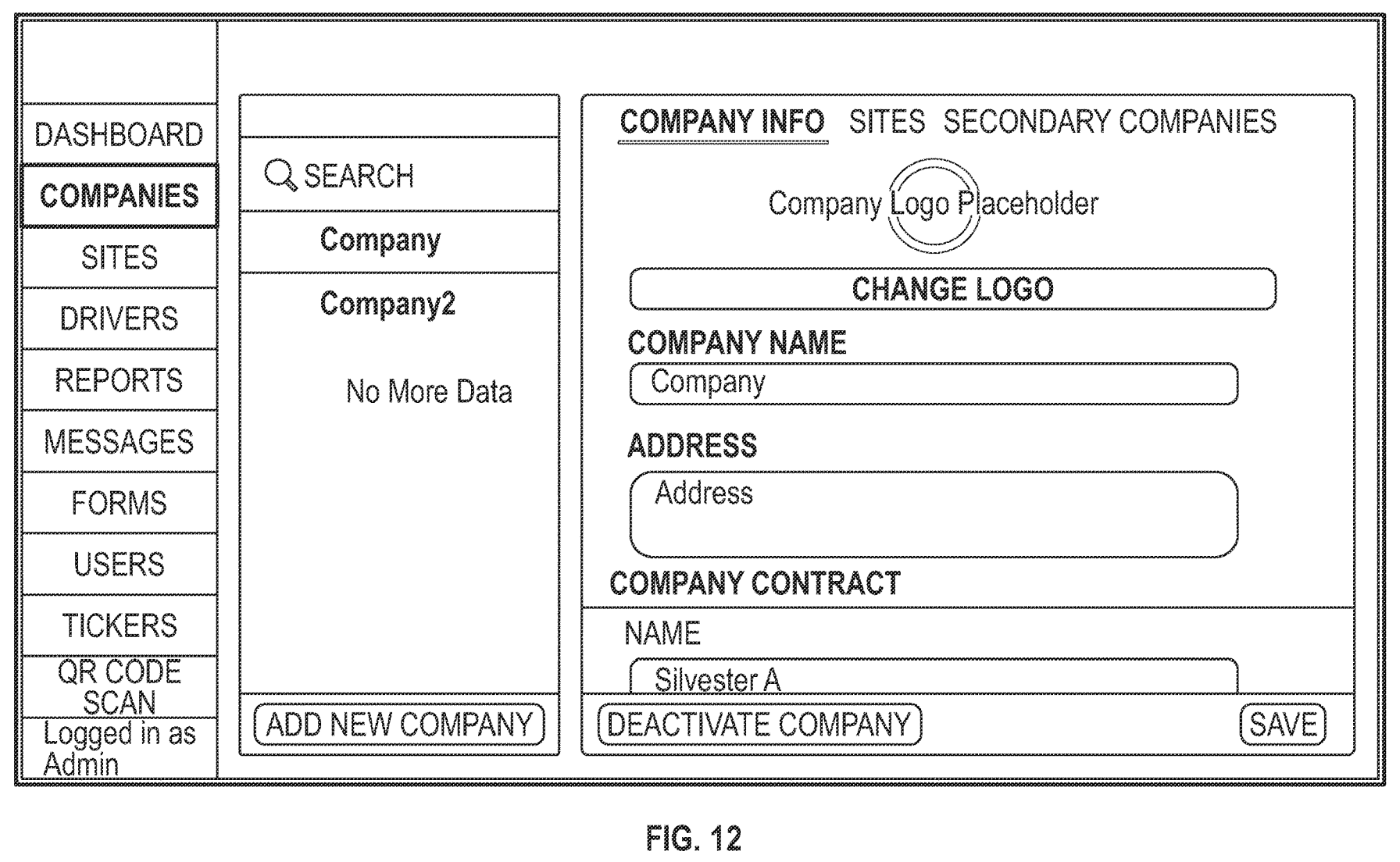

DASHBOARD

COMPANIES

SITES

DRIVERS

REPORTS

MESSAGES

FORMS

USERS

TICKERS

QR CODE SCAN

Logged in as Admin

SEARCH

Company

Company2

No More Data

ADD NEW COMPANY

COMPANY INFO    SITES    SECONDARY COMPANIES

Company Logo Placeholder

CHANGE LOGO

COMPANY NAME

Company

ADDRESS

Address

COMPANY CONTRACT

NAME

Silvester A

DEACTIVATE COMPANY

SAVE

FIG. 12

Figure 13:
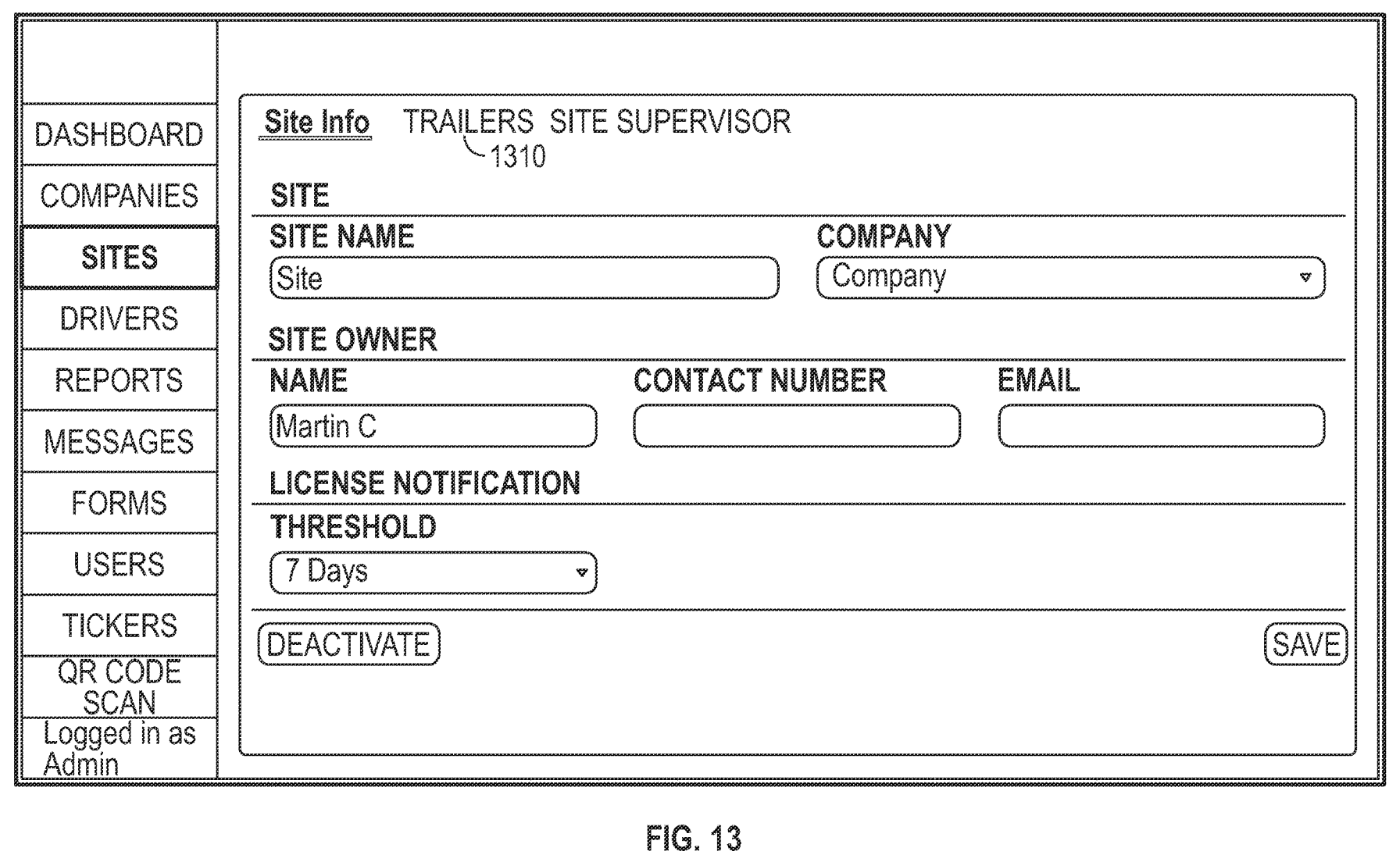

DASHBOARD

COMPANIES

SITES

DRIVERS

REPORTS

MESSAGES

FORMS

USERS

TICKERS

QR CODE SCAN

Logged in as Admin

Site Info    TRAILERS  SITE SUPERVISOR
1310

SITE

SITE NAME
Site

COMPANY
Company

SITE OWNER

NAME
Martin C

CONTACT NUMBER

EMAIL

LICENSE NOTIFICATION

THRESHOLD
7 Days

DEACTIVATE

SAVE

SECURE ACCESS TO TRAILER CONNECTORS

CROSS-REFERENCE TO RELATED APPLICATION

The present application claims priority to and the benefit of the filing date of U.S. Provisional Application No. 63/395,202, filed on Aug. 4, 2022, which is hereby incorporated by reference herein in its entirety.

BACKGROUND

Technical Field

The present disclosure relates generally to trailers and, more particularly, to providing secure access to trailer connectors.

Related Art

Cargo carriers, such as trailers, provide the backbone of economies, transporting everything from food to automobiles. Goods are loaded into the trailers or cargo carriers, and trucks or tractors (e.g., semis) transport the goods therein. A tractor may couple its systems with a trailer to improve safe operation, such as coupling electrical and braking systems. Additionally, a tractor's towing system (e.g., fifth wheel) also couples with a connector of the trailer (e.g., kingpin) to tow the trailer. Even if a trailer is locked to secure the goods it carries, the trailer may not be secure as long as a tractor can easily couple to the trailer and tow it. Accordingly, there is interest in improving security of trailers.

SUMMARY

The present disclosure relates to technologies for providing secure access to one or more connectors of a trailer, such as electrical connectors or compressed-air connections, among others. A driver of a vehicle (e.g., tractor, semi, etc.) towing the trailer generally couples such connectors with the vehicle's systems, such as with the vehicle's electrical systems or compressed-air systems. A driver who cannot couple the trailer connectors to the vehicle's system may not be able to safely tow the trailer or may not be able to tow the trailer at all. The present disclosure provides technologies for providing secure access to the connectors of a trailer, so that unauthorized drivers will not be able to tow the trailer or will not be able to safely tow the trailer.

As used herein, the term "trailer" refers to and includes any mobile compartment of any size, shape, or configuration, that is towed by a vehicle (e.g., tractor, semi, etc.). The term "connector" of a trailer refers to and includes any mechanism of a trailer which is configured to form a connection with another mechanism. A connector of a trailer may include, without limitation, an electrical connector, a compressed-air connector, or a towing connector, among other things.

In accordance with aspects of the present disclosure, an apparatus for providing secure access to a trailer connector includes a cover, a locking device, and a controller. The cover is configured to be secured to a trailer and is configured to cover at least one connector of the trailer. The trailer is configured to be towed by a vehicle and the at least one connector is configured to couple with at least one system of the vehicle. The cover has an open position in which the at least one connector is accessible to form a connection with the at least one system of the vehicle and a closed position in which the at least one connector is inaccessible. The locking device has a first state and a second state, where the first state is configured to hold the cover in the closed position and the second state is configured to permit the cover to move from the closed position to the open position. The controller is communicatively coupled to the locking device. The controller is configured to cause the locking device to change from the first state to the second state, to permit the cover to move from the closed position to the open position, based on an authorization.

In embodiments of the apparatus, the at least one connector includes an electrical connector configured to couple with an electrical system of the vehicle, and the apparatus includes a battery and power circuitry coupled to the electrical connector and the battery. The power circuitry causes the battery to be recharged when the electrical connector is coupled to an electrical source.

In embodiments of the apparatus, the apparatus includes a wireless communication device coupled to the controller, and the controller is further configured to communicate with a central system, using the wireless communication system, to receive the authorization from the central system.

In embodiments of the apparatus, the apparatus includes a keypad code input device, and the authorization is based on a code input on the keypad code input device being an authorized code.

In embodiments of the apparatus, the apparatus includes a QR reader code input device, and the authorization is based on a QR code input to the QR reader code input device being an authorized code.

In embodiments of the apparatus, the authorized code to be input to the keypad code input device changes over time.

In embodiments of the apparatus, the wireless communication device includes a cellular transceiver and a cellular antenna.

In embodiments of the apparatus, the apparatus includes at least one of: a GPS receiver or a temperature sensor configured to be positioned within an interior of the trailer. The controller is configured to receive at least one of: a temperature measurement from the temperature sensor, or a geographical coordinate from the GPS receiver, and communicate at least one of: the temperature measurement or the geographical coordinate, to the central system.

In accordance with aspects of the present disclosure, a method is disclosed for using an apparatus to provide secure access to at least one connector of a trailer. The apparatus includes a locking device, a controller, and a cover. The cover is configured to be secured to the trailer and to cover the at least one connector of the trailer. The trailer is configured to be towed by a vehicle and the at least one connector is configured to couple with at least one system of the vehicle. The cover has an open position in which the at least one connector is accessible to form a connection with the at least one system of the vehicle and a closed position in which the at least one connector is inaccessible. The method includes receiving an authorization, and includes causing, by the controller, based on the authorization, the locking device to change from the a first state to a second state, where the first state of the locking device is configured to hold the cover in the closed position and the second state of the locking device is configured to permit the cover to move from the closed position to the open position.

In embodiments of the method, the at least one connector includes an electrical connector and the apparatus includes a battery and power circuitry coupled to the electrical connector and the battery. The method includes causing, by the power circuitry, the battery to recharge when the electrical connector is coupled to an electrical source.

In embodiments of the method, the apparatus includes a wireless communication device coupled to the controller, and the method includes communicating with a central system, using the wireless communication system, to receive the authorization from the central system.

In embodiments of the method, apparatus includes a keypad code input device, and the authorization is based on a code input on the keypad code input device being an authorized code.

In embodiments of the method, the apparatus includes a QR reader code input device, and the authorization is based on a QR code input to the QR reader code input device being an authorized code.

In embodiments of the method, the authorized code to be input to the keypad code input device changes over time.

In embodiments of the method, the wireless communication device includes a cellular transceiver and a cellular antenna.

In embodiments of the method, the apparatus includes at least one of: a GPS receiver, or a temperature sensor configured to be positioned within an interior of the trailer. The method includes, by the controller: receiving a temperature measurement from the temperature sensor and/or a geographical coordinate from the GPS receiver, and communicating the temperature measurement and/or the geographical coordinate, to the central system.

In accordance with aspects of the present disclosure, a system for providing secure access to trailers includes: a communication device, a storage device, at least one processor, and at least one memory. The storage device stores driver information on a plurality of drivers. The storage device further stores trailer information on a plurality of trailers, where the trailer information includes, for each trailer, information on an apparatus associated with the respective trailer and covering at least one connector of the respective trailer. Each apparatus includes a locking device and wireless communication capability. The storage device further stores a schedule of times at which drivers of the plurality of drivers are authorized to access trailers of the plurality of trailers. The at least one memory stores instructions which, when executed by the at least one processor, cause the system to, without human intervention: (i) receive, via the communication device, a communication from an electronic device of a driver, where the communication includes authentication information for the driver; (ii) identify, based on the driver information, a particular driver identified by the authentication information for the driver; and (iii) based on determining that the particular driver is authorized to access a particular trailer based on the schedule, communicate, via the communication device, at least one of: (a) an authorization to the respective apparatus of the particular trailer, where the authorization is configured to unlock the locking device of the respective apparatus and provide the particular driver with access to the at least one connector of the particular trailer, or (b) an authorized code to the electronic code of the driver, where the authorized code is configured to be input by the driver to a code input device of the respective apparatus of the particular trailer.

In embodiments of the system, the code input device is a keypad code input device.

In embodiments of the system, the authorized code to be input to the code input device changes over time.

In embodiments of the system, each apparatus of the apparatuses associated with the plurality of trailers includes a GPS receiver configured to provide a geographical coordinate and a temperature sensor configured to provide a temperature measurement. The instructions, when executed by the at least one processor, further cause the system to: receive, via the communication device, geographical coordinates and temperature measurements from the apparatuses associated with the plurality of trailers; and serve a user interface to a client device, where the user interface displays trailer locations based on the geographic coordinates and displays trailer temperatures based on the temperature measurements.

In accordance with aspects of the present disclosure, a computer-implemented method for providing secure access to trailers includes storing, in a storage device, driver information on a plurality of drivers, where the driver information includes, for each driver, a code that identifies the respective driver. The method further includes storing, in the storage device, trailer information on a plurality of trailers, where the trailer information includes, for each trailer, information on an apparatus associated with the respective trailer and covering at least one connector of the respective trailer. Each apparatus includes a locking device, a code input device, and wireless communication capability. The method further includes storing, in the storage device, a schedule of times at which drivers of the plurality of drivers are authorized to access trailers of the plurality of trailers. The method also includes, without human intervention: (i) receiving, by a communication device, a communication from a particular apparatus among the apparatuses associated with the plurality of trailers, where the communication includes a code input at the code input device of the particular apparatus and a particular time of the code input; (ii) identifying, by a processor and based on the trailer information, a particular trailer associated with the particular apparatus; (iii) identifying, by the processor and based on the driver information, a particular driver identified by the code input at the code input device; and (iv) based on determining, by the processor, that the particular driver was authorized to access the particular trailer at the particular time based on the schedule, communicating, via the communication device, an unlock instruction to the particular apparatus. The unlock instruction is configured to unlock the locking device of the particular apparatus and provide the particular driver with access to the at least one connector of the particular trailer.

In embodiments of the computer-implemented method, each apparatus of the apparatuses associated with the plurality of trailers includes a GPS receiver configured to provide a geographical coordinate and a temperature sensor configured to provide a temperature measurement. The method further includes: receiving geographical coordinates and temperature measurements from the apparatuses associated with the plurality of trailers; and serving a user interface to a client device, where the user interface displays trailer locations based on the geographic coordinates and displays trailer temperatures based on the temperature measurements.

In accordance with aspects of the present disclosure, a computer-readable medium stores instructions which, when executed by a processor of a system, cause the system to: store, in a storage device, driver information on a plurality of drivers, where the driver information includes, for each driver, a code that identifies the respective driver; and store, in the storage device, trailer information on a plurality of trailers, where the trailer information includes, for each trailer, information on an apparatus associated with the respective trailer and covering at least one connector of the respective trailer. Each apparatus includes a locking device, a code input device, and wireless communication capability. The instructions, when executed by a processor of a system, further cause the system to store, in the storage device, a schedule of times at which drivers of the plurality of drivers are authorized to access trailers of the plurality of trailers; and, without human intervention: (i) receive, by a communication device, a communication from a particular apparatus among the apparatuses associated with the plurality of trailers, where the communication includes a code input at the code input device of the particular apparatus and a particular time of the code input; (ii) identify, by a processor and based on the trailer information, a particular trailer associated with the particular apparatus; (iii) identify, by the processor and based on the driver information, a particular driver identified by the code input at the code input device; and (iv) based on determining, by the processor, that the particular driver was authorized to access the particular trailer at the particular time based on the schedule, communicate, via the communication device, an unlock instruction to the particular apparatus. The unlock instruction is configured to unlock the locking device of the particular apparatus and provide the particular driver with access to the at least one connector of the particular trailer.

In embodiments of the computer-readable medium, each apparatus of the apparatuses associated with the plurality of trailers further includes a GPS receiver configured to provide a geographical coordinate and a temperature sensor configured to provide a temperature measurement. The instructions, when executed by the processor, further causes the system to: receive, via the communication device, geographical coordinates and temperature measurements from the apparatuses associated with the plurality of trailers; and serve a user interface to a client device, the user interface displaying trailer locations based on the geographic coordinates and displaying trailer temperatures based on the temperature measurements.

The details of one or more embodiments of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

A detailed description of embodiments of the disclosure will be made with reference to the accompanying drawings, wherein like numerals designate corresponding parts in the figures.

FIG. 8 is a flow diagram of an exemplary operation of a central system, in accordance with aspects of the present disclosure;

FIG. 11 is a diagram of an exemplary dashboard user interface display screen showing trailer temperatures, in accordance with aspects of the present disclosure;

FIG. 12 is a diagram of an exemplary user interface display screen for a companies tab, in accordance with aspects of the present disclosure;

FIG. 13 is a diagram of an exemplary user interface display screen for a sites tab, in accordance with aspects of the present disclosure;

FIG. 15 is a diagram of another exemplary user interface display screen for a drivers tab, in accordance with aspects of the present disclosure;

FIG. 17 is a diagram of an exemplary user interface display screen for a reports tab, in accordance with aspects of the present disclosure;

DETAILED DESCRIPTION

The present disclosure relates to technologies for providing secure access to one or more connectors of a trailer, such as electrical connectors or compressed-air connections, among others. A driver of a vehicle (e.g., tractor, semi, etc.) towing the trailer generally couples such connectors with the vehicle's systems, such as with the vehicle's electrical systems or compressed-air systems. A driver who cannot couple the trailer connectors to the vehicle's system may not be able to safely tow the trailer or may not be able to tow the trailer at all. The present disclosure provides technologies for providing secure access to the connectors of a trailer, so that unauthorized drivers will not be able to tow the trailer or will not be able to safely tow the trailer.

Figure 1:
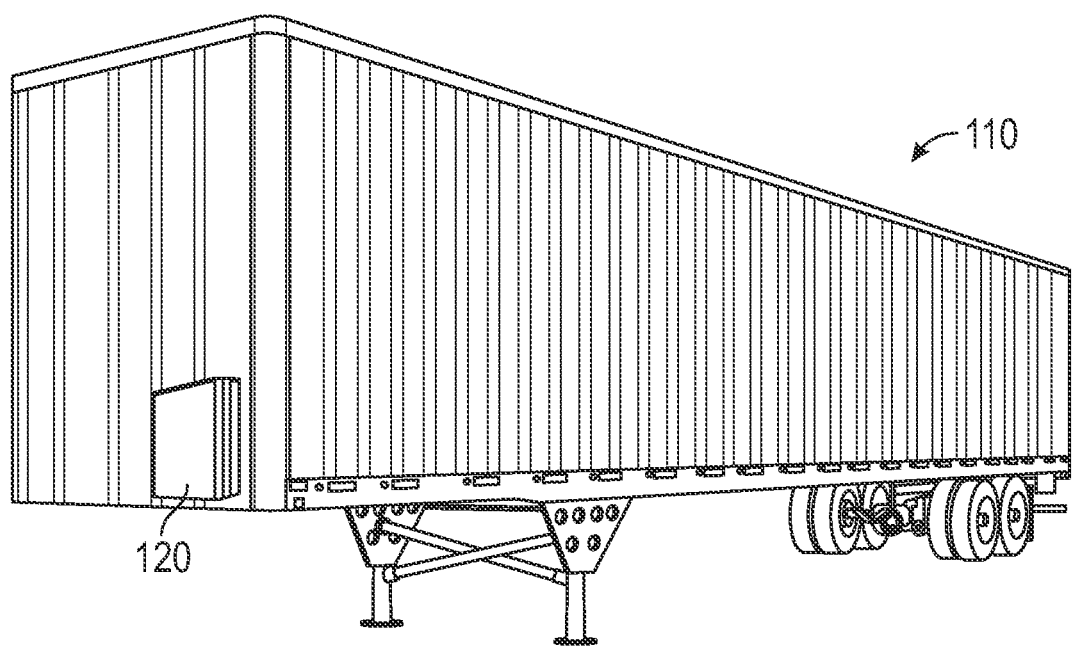
FIG. 1 is a diagram of an exemplary trailer having an apparatus according to aspects of the present disclosure.

FIG. 1 shows a diagram of an exemplary trailer 110. As mentioned above, the term "trailer" refers to and includes any mobile compartment of any size, shape, or configuration, that is towed by a vehicle. The illustrated trailer 110, commonly known as a semi-trailer, is towed by a tractor and has connectors that couple with the tractor's systems, such as electrical systems and compressed-air systems. Such systems aid in safe towing of the trailer 110. As mentioned above, even if the trailer 110 is locked to secure the goods it carries, the trailer 110 may not be secure as long as a tractor can easily couple to the trailer 110 and tow it. For convenience, the description from this point on will use the term "vehicle" to generally refer to any vehicle that tows a trailer.

Figure 2:
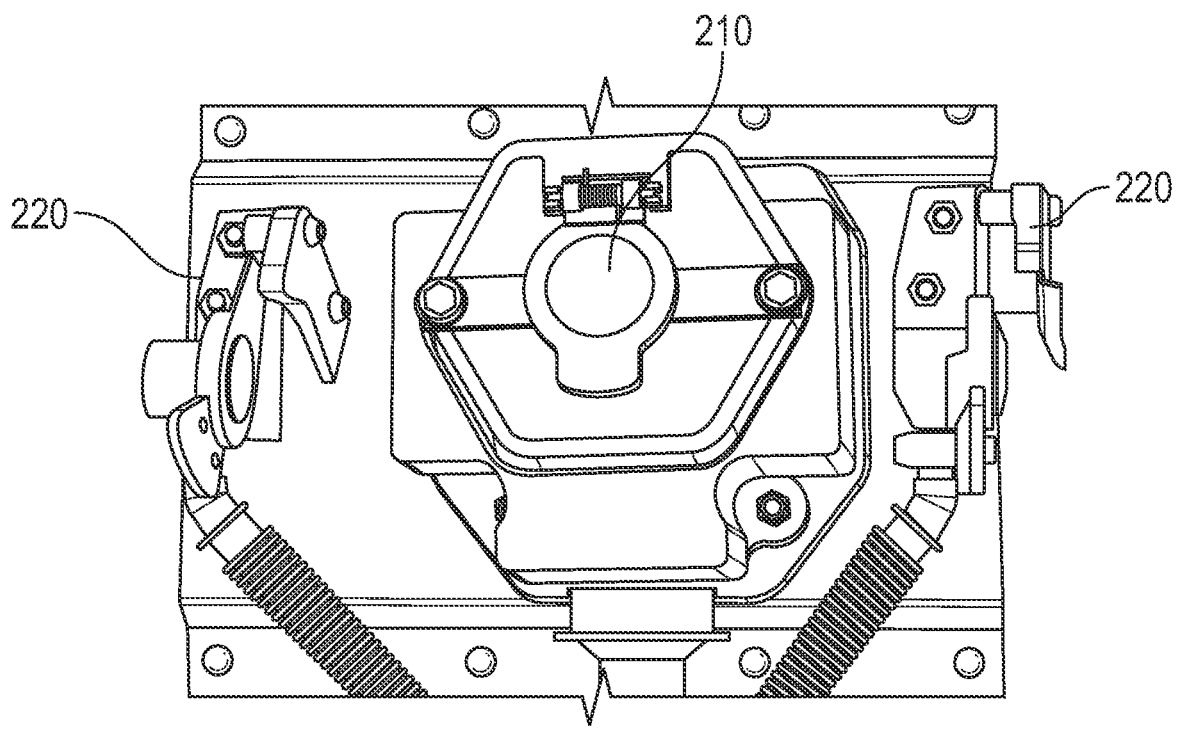
FIG. 2 is a diagram of exemplary connectors of a trailer, in accordance with aspects of the present disclosure.

In accordance with aspects of the present disclosure, an apparatus 120 according to the present disclosure may be secured to a trailer 110 to cover a connector or connectors on the trailer 110 that are configured to couple to a vehicle's systems. The apparatus 120 will be described in more detail in connection with FIG. 4. For now, it is sufficient to note that the apparatus 120 has a locking device which, when locked, prevents a driver from coupling the trailer's connector(s) to the vehicle's systems. In the illustrated example of FIG. 1, the apparatus 120 has a cover that covers the trailer's connector(s), such as the exemplary connectors shown in FIG. 2. In FIG. 2, the connectors include an electrical connector 210 and two compressed-air connectors 220. When the locking device of the apparatus 120 is locked, a driver would not be able to access such connectors 210, 220. When the locking device is unlocked, the cover may open to provide the driver access to the connector(s) 210, 220. A driver may then couple the connectors 210, 220 to the vehicle's electrical and compressed-air systems. FIG. 1 and FIG. 2 are exemplary, and trailers, apparatuses, and connectors different from those illustrated are contemplated to be within the scope of the present disclosure.

Figure 3:
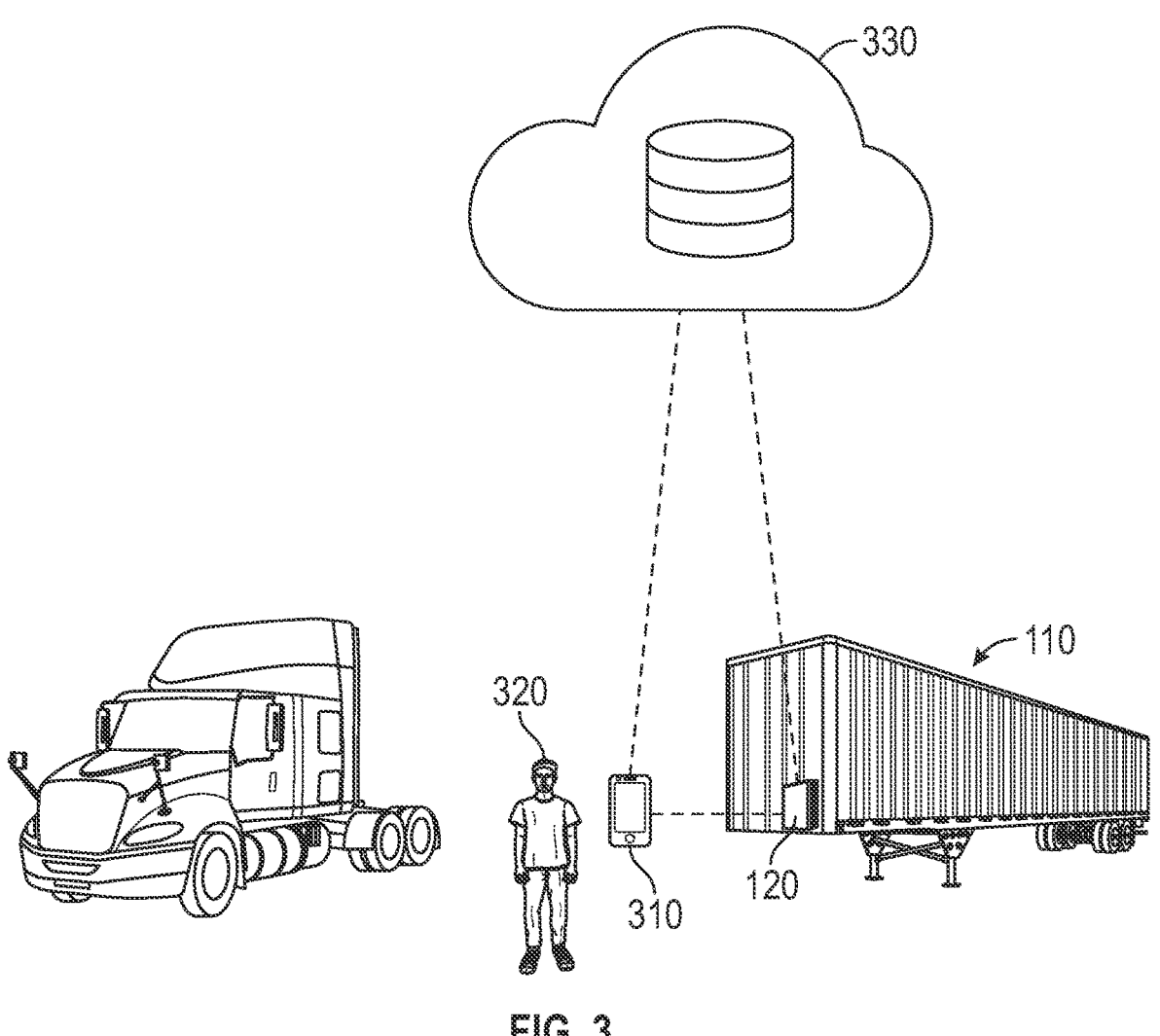
FIG. 3 is a diagram of an exemplary systems and devices involved in accessing a trailer, in accordance with aspects of the present disclosure.

FIG. 3 shows various systems and devices involved in providing a driver of a vehicle with secure access to a trailer. FIG. 3 shows the apparatus 120 secured to the trailer 110, an electronic device 310 of the driver 320, and a central system 330 in communication with the apparatus 120 and with the electronic device 310. The apparatus 120 will be described in more detail in connection with FIG. 4, and the central system 330 will be described in more detail in connection with FIG. 5. For now, it is sufficient to note that the apparatus 120 has wireless communication capability, and the apparatus 120, the trailer 110, and the driver 320 are all registered with the central system 330. The central system 330 can communicate with the apparatus 120 and with the driver's electronic device 310 over various communications networks, such as cellular networks, Wi-Fi networks, and Internet backbone, among others. The central system 330 is "central" in the sense that it communicates with apparatuses 120 secured to trailers 130. The central system 330 may be implemented as a cloud system, a distributed system, an on-premises system, and/or a proprietary system, among other implementations, or as some combination of the foregoing.

The apparatus 120 may be unlocked using a variety of methods. As used herein, the term "authorization" means and includes any signal (for example, a signal of a code input device at the apparatus 120 or a signal from the central system 330) that authorizes the apparatus 120 to unlock.

In embodiments, the central system may transmit an authorization to the apparatus 120 to authorize the apparatus 120 to unlock. In embodiments, the driver 320 may use the electronic device 310 to request that the apparatus 120 be unlocked. The driver electronic device 310 may communicate with central system 330 (e.g., via an application or a web portal) to authenticate the driver 320, and the central system 300 may then verify that the driver is on the schedule to access the trailer 110. Based on the central system 330 verifying the driver 320, the central system 330 may transmit an authorization (e.g., a signal) to the apparatus 120 to cause the apparatus 120 to unlock.

In embodiments, the central system 330, after verifying the driver 320, may transmit an unlock code to the electronic device 310, such as a PIN code, among other possibilities. The driver 320 may input the PIN code or other code directly to a code input device (e.g., a keypad) at the apparatus 120 after retrieving it from central system 330. The code input device may, in response to entry of the code, provide an authorization (e.g., a signal) to cause the apparatus 120 to unlock. Embodiments relating to a keypad and PIN code will be described in more detail later herein.

In embodiments, the central system 330 can communicate a scannable code to the driver's electronic device 310 (e.g., to an application of the electronic device 310, or via email, text message, etc.), and the driver 320 can input the scannable code to the apparatus 120. In embodiments, the scannable code may be an electronic code that may be displayed on the screen of the driver's electronic device 310 (such as a QR code or a bar code, among other things), and the apparatus 120 may scan the code displayed on the electronic device 310. Various possibilities for the code may be described in more detail in connection with FIG. 4.

In embodiments, the driver electronic device 310 may not communicate first with the central system 310. Rather, the driver 320 or the driver electronic apparatus 310 may input a code to the apparatus 120, such as a PIN code or a scannable code that uniquely identifies the driver, among other possible codes. The apparatus 120 receives a code input by the driver or the driver's electronic device 310 and communicates such code to the central system 330. The central system 330 determines whether the code received by the apparatus 120 is an authorized code. If the central system 330 determines that the code is an authorized code, the central system 330 transmit an authorization that instructs the apparatus 120 to unlock. If the central system 330 determines that the code is not an authorized code, the central system 330 instructs the apparatus 120 to remain locked.

In embodiments, because the apparatus 120 has wireless communication capability and communicates with the central system 330 to confirm that the code input to the apparatus 120 is an authorized code, the central system 330 can maintain multiple authorized codes (e.g., corresponding to multiple drivers) and/or change the authorized codes over time, such as changing codes according to a schedule of drivers. Such capabilities provide security for the trailer 110 without hindering the ability of authorized drivers to access the trailer 110. FIG. 3 is merely illustrative, and systems and devices different from those shown or described above are contemplated to be within the scope of the present disclosure.

Figure 4:
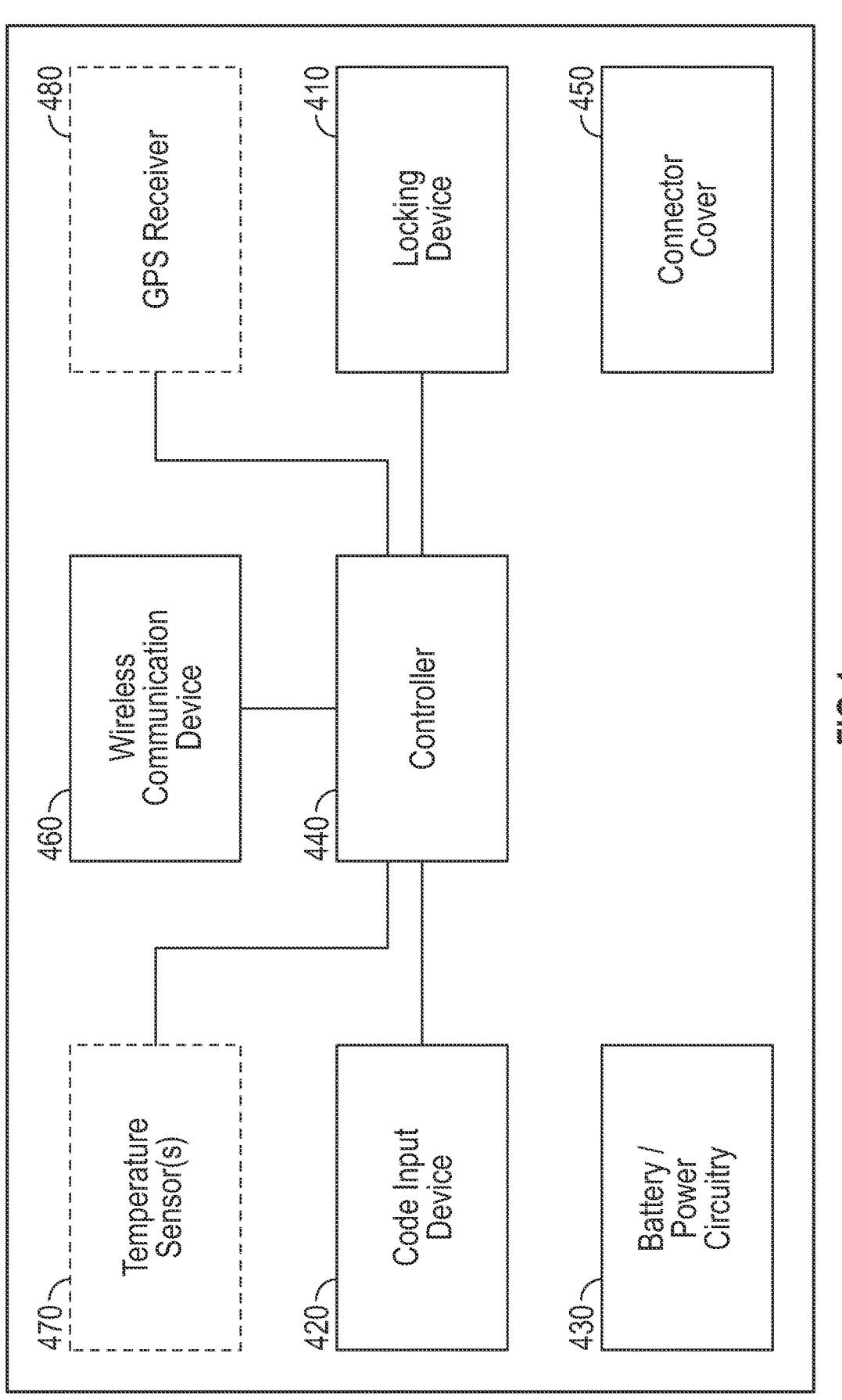
FIG. 4 is a block diagram of exemplary components of an apparatus, in accordance with aspects of the present disclosure.

FIG. 4 is a block diagram of exemplary components of an apparatus according to aspects of the present disclosure, such as the apparatus 120 of FIG. 1 or FIG. 3. As described above, the apparatus is secured to a trailer and covers one or more connectors of the trailer. In the illustrated embodiment, the apparatus includes a locking device 410, a code input device 420, a battery and power circuitry 430, a controller 440, a connector cover 450, and a wireless communication device 460. In embodiments, the apparatus includes an optional temperature sensor 470 and/or an optional GPS receiver 480.

The locking device 410 may be any device that has a locked state and an unlocked state. In embodiments, the locking device 410 may be a mechanical locking device and/or a magnetic locking device. In embodiments, the locking device 410 interacts with the connector cover 450, which may have any size, shape, or configuration that covers one or more connectors of a trailer. The connector cover 450 has a closed position and an open position. In the closed position, the cover 450 prevents a driver from accessing the trailer connector(s), and in the open position, the driver is provided with access to the trailer connector(s) to couple them to or uncouple them from a vehicle's systems.

The locking device 410 interacts with the connector cover 450 and has a first state in which the locking device 410 holds the cover 450 in the closed position (i.e., driver has no access to trailer connector(s)) and has a second state in which the locking device 410 allows the cover 450 to transition from the closed position to the open position to provide a driver with access to the trailer connector(s). When the locking device 410 is a magnetic locking device, the first state may correspond to an activated magnetic field of the locking device that holds the cover 450 and the second state may correspond to temporarily deactivated magnetic field of the locking device 410. When the locking device 410 is a mechanical locking device, the first state may correspond to a latch position that holds a cover 450 and the second state may correspond to rotated latch position that releases a cover 450. The locking device 410 may have states other than those described herein.

The code input device 420 may be or include, without limitation, a keypad, an optical scanner or receiver (such as a quick response (QR) code scanner, barcode scanner, infrared receiver, etc.), a microphone, and/or a wireless signal reader (e.g., radio-frequency ID (RFID) reader or near field communication (NFC) reader), among other things. As used herein, the term "code" refers to an input to the code input device and may be or may include a PIN, an alphanumeric string, a graphic, a QR code, a barcode, a coded audio signal, a coded infrared signal, a coded radio frequency signal, biometric authentication (e.g., fingerprint or retinal scan), and/or another type of code. As persons skilled in the art will understand, various types of codes, such as QR codes, include many information fields, and the code input device 420 may extract the information fields from the code. In embodiments, the code that is input to the code input device 420 (e.g., QR code) may not itself be the authorized code for unlocking the locking device 410 but may contain or include the authorized code in one or more information fields.

In embodiments using a PIN code or an alphanumeric string, or another similar code, to unlock the apparatus, such a code may be maintained by the controller 440, and the controller 440 may change the code periodically (e.g., every hour). Referring also to FIG. 3, both the apparatus 120 and the central system 330 can have a preloaded list of such codes and/or a predetermined algorithm that determines the codes. The apparatus 120 and the central system 330 may synchronously (and independently) change the code over time so that they both utilize the same code at the same time.

The code input at the code input device 420 is provided to the controller 440, and the controller 440 controls the locking device 410. The controller 440 may be and/or include any computing circuitry and may include, without limitation, a microcontroller, a microprocessor, a digital signal processor, a central processing unit, or another such computing circuitry. In embodiments, the controller 440 may receive analog signals and may include analog-to-digital converters that sample the signals. In embodiments, the controller 440 may receive digital signals, such as signals from the code input device 420. The sampled signals and/or the digital signals may be converted into binary values, and the controller 440 may include machine instructions, such as firmware, that perform computations using the binary values. The controller 440 may output signals to other devices, such as outputting signals to the locking device 410 to control the locking device 410.

The controller 440 is coupled to the wireless communication device 460 and may communicate via the wireless communication device 460, e.g., with a central system (e.g., 330, FIG. 3). The wireless communication device 460 may be or may include a cellular transceiver and a cellular antenna, and/or other types of wireless transceivers and antennas (e.g., Wi-Fi, Internet of Things, etc.). In embodiments, the controller 440 may receive, from the central system, an authorization to unlock the locking device 410, as described above herein.

In embodiments, the electrical components of the apparatus are powered by the battery and the power circuitry 430. In embodiments, the apparatus may not include a battery and may be powered by power circuitry 430 connected to a power source of the trailer. In embodiments, the power circuitry manages the power supplied by the battery and/or by the power source and may provide voltages used by the components, such as +5V and/or +12V, among others. In embodiments, the battery may be rechargeable and the power circuitry can operate to recharge the battery when the trailer's connector(s) are coupled with the electrical system of a vehicle. In embodiments, the apparatus may include a solar panel (not shown), and the power circuitry may charge the battery using power generated by the solar panel. Other embodiments are contemplated to be within the scope of the present disclosure.

As shown in FIG. 4, the apparatus may include an optional GPS receiver 480 and one or more optional temperature sensor(s) 470. The GPS receiver 480 may be located within the apparatus. The GPS receiver 480 may operate to obtain a location coordinate, and the controller 440 may communicate the location coordinate to the central system to report the location of the apparatus and trailer. In embodiments, a temperature sensor 470 may be located within the apparatus and may indicate the operating temperature within the apparatus. In embodiments, a temperature sensor 470 may be positioned within the trailer and may indicate the operating temperature within the trailer, and such a temperature sensor 470 may be physically or wirelessly coupled to the apparatus. The temperature sensor(s) 470 may obtain temperature measurements, and the controller 440 may communicate the temperature measurements to the central system to report the temperature of the apparatus and/or the trailer.

FIG. 4 is exemplary, and not all components of an apparatus are illustrated, such as a housing, physical mounting hardware, and wires. The apparatus may include other components that are not illustrated, such as a display, LEDs, and/or a speaker, among other things. Such and other components are contemplated to be included in or with the apparatus.

Figure 5:
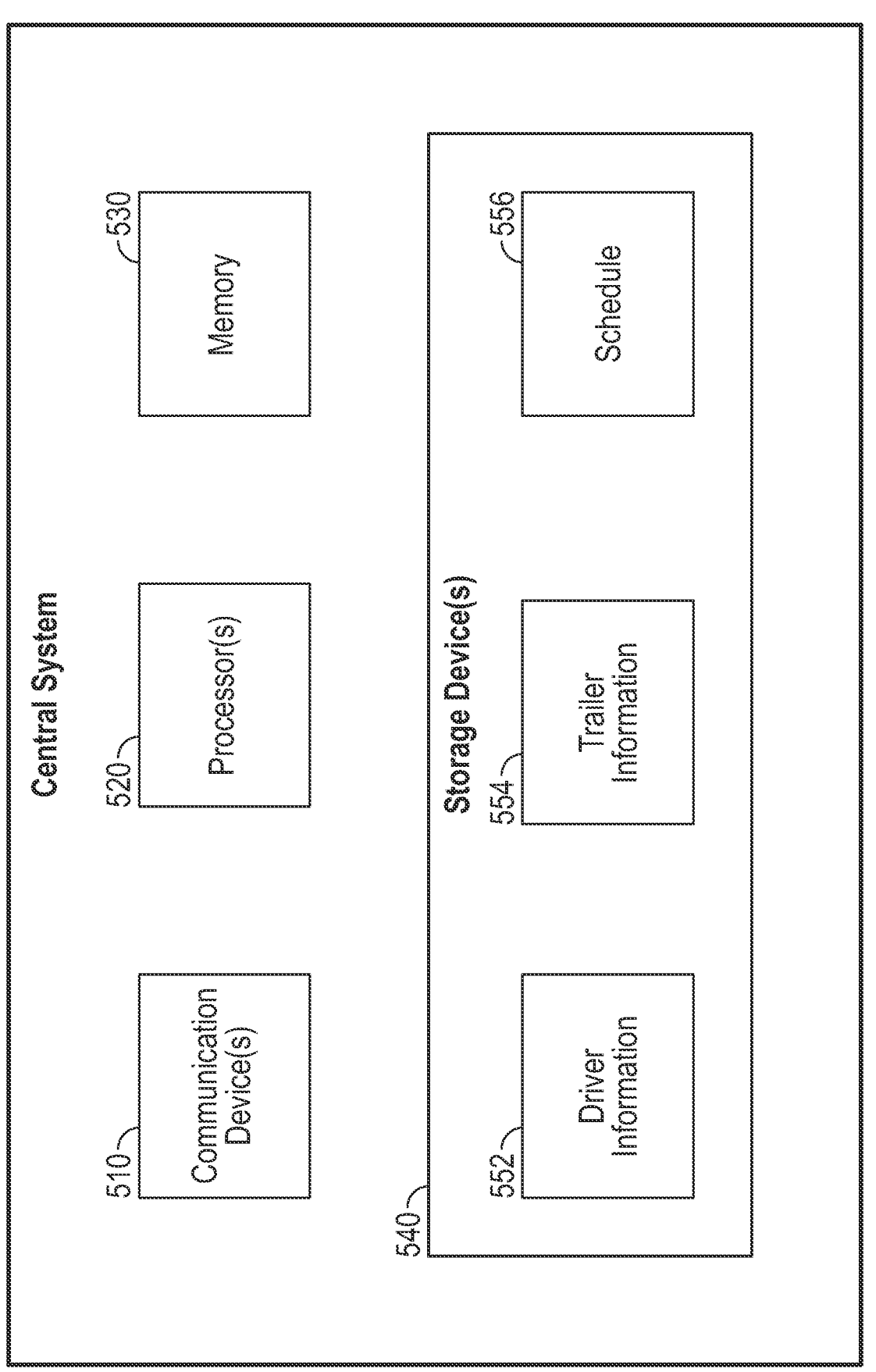
FIG. 5 is a block diagram of exemplary components of a central system (e.g., cloud system, etc.) for communicating with apparatuses secured to trailers, in accordance with aspects of the present disclosure.

Referring now to FIG. 5, there is shown a block diagram of exemplary components and information of a central system. The central system may be and/or may include a cloud computing system and/or a proprietary computing system, such as servers. The system is "central" in the sense the system manages information centrally for geographically disparate devices. The implementation of the central system, however, may be distributed geographically such that portions of cloud computing resources and/or portions of proprietary computing resources may be located in different geographies.

In the illustrated embodiment, the central system includes one or more communication devices 510, one or more processors 520, memory 530, and one or more storage devices 540. The communication device(s) 510 may be or may include a wired communication device using a wired communication protocol (e.g., Ethernet) and/or a wireless communication device using a wireless communication protocol (e.g., Wi-Fi). The memory 530 may be or may include any type of volatile memory, non-volatile memory, or random access memory. The processor(s) 520 may be or may include any computing device or computational circuit or any type of processing circuit capable of executing a series of instructions. The processor(s) 520 may include multiple processors and/or multicore central processing units (CPUs) and may include any type of processor, such as a microprocessor, digital signal processor, microcontroller, programmable logic device (PLD), field programmable gate array (FPGA), or the like. The memory 530 stores data and/or instructions for the processor(s) 520 to use and/or execute to cause the central system to perform one or more methods and/or algorithms. The storage device(s) 540 may be and/or may include any electronic storage, including, for example, hard disk drives, solid state drives, optical storage media (e.g., DVD, etc.), and/or backup storage media (e.g., tape, cloud storage, etc.), among other things.

As shown in FIG. 5, the storage device(s) 540 store driver information 552, trailer information 554, and a schedule 556. The driver information 552 includes information on drivers registered with the central system, such as driver identification, biographic information, and/or professional information (e.g., employer, licenses, etc.), among other things. In embodiments, each driver registered with the central system may be assigned a QR code. In embodiments, the driver information 552 may include credentials for a driver to be authenticated to the central system. The credentials can be proprietary to the central system or can be credential from a third-party. Third-party credentials can include credentials for accessing third-party services, such as Google, AOL, or Microsoft. The trailer information 554 includes information on trailers registered with the central system, such as trailer identification, equipment information (e.g., size dimensions, refrigeration, etc.), and/or legal information (e.g., owner, lessor, insurance, etc.), among other things, such as the information described below in connection with FIG. 6. The schedule 556 indicates times at which the drivers are scheduled to operate the trailers and is used by the central system to determine whether a driver is authorized to access a trailer and/or to determine whether a code input at a code input device of an apparatus is an authorized code. The storage device(s) 540 and/or the memory 530 store instructions that are executed by the processor(s) 520. The instructions implement the operations of the central system, such as operations for serving user interface screens to client devices for various purposes (e.g., FIG. 9), operations for providing codes to electronic devices of drivers, operations for determining whether a code input at a code input device of an apparatus is an authorized code, and/or any other operation or algorithm disclosed herein.

FIG. 5 is exemplary, and the central system may include other components not illustrated in FIG. 5, such as power supplies, various data, and various software, among other things. Persons skilled in the art will understand such and other components of the central system.

Figure 6:
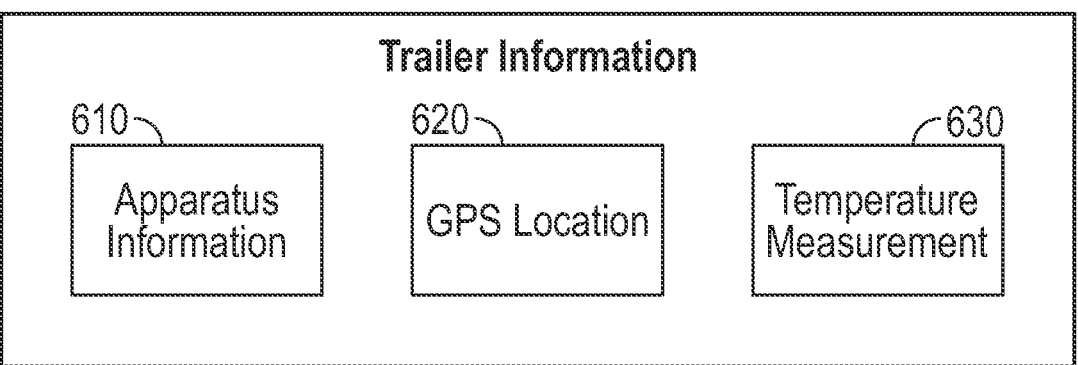
FIG. 6 is a block diagram of exemplary information stored in a central system (e.g., cloud system, etc.), in accordance with aspects of the present disclosure.

FIG. 6 is a block diagram of exemplary information that may be stored as part of the trailer information for a particular trailer. The trailer information may include apparatus information 610 for an apparatus according to the present disclosure that is installed on the trailer. The apparatus information 610 may include, for example, a serial number and model number for the apparatus. In embodiments, the apparatus information 610 may include, as mentioned above, an algorithm for changing PIN codes for accessing a trailer. The trailer information may also store GPS location information 620 and temperature measurements 630 that are reported by the apparatus installed on the trailer. As described in more detail later herein, the GPS location 620 may be monitored to determine the current location of the trailer and its travel history, and the temperature measurements 630 may be monitored to confirm that the trailer is operating properly. FIG. 6 is exemplary, and other trailer information, such as the information described in connection with FIG. 5, are contemplated to be in the trailer information.

With reference also to FIGS. 1 and 3, GPS location 620 can be further used in the present disclosure in various embodiments to increase or decrease access to the apparatus 120. The GPS location 620 of a trailer 110 can be communicated to the central system 330 in order to provide useful information that subsequently changes access to the apparatus 120. The GPS location 620 can be used to track the location of the trailer 110 and track whether the trailer 110 deviates off its expected course. If the trailer 110 deviates from its expected location, the central system 330 can alert the driver 320 by sending an alert to the driver's electronic device 310. Alternatively, or in addition, the central system 330 can notify a system administrator of the deviation of a trailer 110 from its expected course. In embodiments, the central system 330 can change access to the apparatus 120 based on the trailer's location. For example, if a trailer is in a trailer yard, one or more yard workers may automatically be authorized to access the apparatus 120 based on the GPS location 620 being in a trailer yard. Thus, if the yard worker finds it necessary to move the trailer 110, the yard worker would have access to the trailer to do so.

Figure 7:
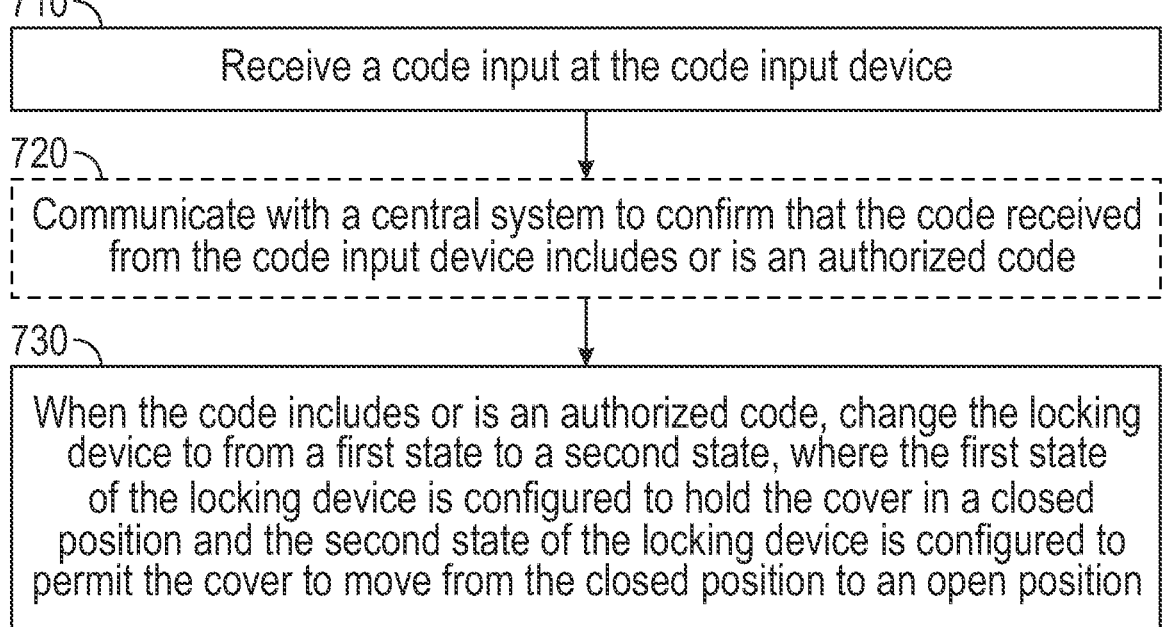
FIG. 7 is a flow diagram of an exemplary operation of an apparatus according to aspects of the present disclosure.

FIG. 7 is a flow chart of an exemplary operation of an apparatus installed on a trailer, such as the apparatus of FIG. 1 or FIG. 3. At block 710, the operation involves receiving a code input at the code input device of the apparatus. As described above, different types of code input devices are contemplated to be within the scope of the present disclosure, and the code may be any input to any such code input device. In embodiments, the code input device may be a keypad, and the code may be a PIN. In embodiments, the code input device may be a QR reader, and the code may be a QR code displayed on a driver's electronic device. At block 720, the operation optionally involves communicating with a central system to confirm that a code received from the code input device includes or is an authorized code. Block 720 is optional because not every implementation may require confirmation with the central system. For example, in embodiments, the apparatus itself may store one or more authorized code and may determine whether the code input at the code input device includes or is an authorized code. If block 720 is implemented, the central system determines whether the code input at the code input device includes or is an authorized code and communicates the determination to the apparatus. At block 730, when the code includes or is an authorized code, the operation involves changing the locking device to from a first state, in which the locking device is configured to hold a cover in a closed position, to a second state, in which the cover is permitted to move from the closed position to an open position. In the manner shown in FIG. 7, a driver may unlock the apparatus to access a trailer's connector(s) and couple them to a vehicle's systems, such as a vehicle's electrical and/or compressed-air systems.

With reference also to FIG. 3, the operations of FIG. 7 may be used to unlock the apparatus 120 by inputting a PIN, an alphanumeric string, or another code to unlock the apparatus 120. The PIN code can change periodically (e.g., every hour). Both the apparatus 120 and the central system 330 can each have a preloaded list of PIN codes or a predetermined algorithm that changes the PIN codes over time. The PIN codes may be independently, but synchronously, maintained by the apparatus 120 and central system 330.

FIG. 8 is a flow chart of an exemplary operation of a central system, such as the central system of FIG. 3 or FIG. 5. At block 810, the operation involves storing driver information on drivers registered with the central system, where the driver information includes, for each driver, a code that identifies the respective driver. At block 820, the operation involves storing trailer information on trailers registered with the central system, where the trailer information includes, for each trailer, information on an apparatus associated with the respective trailer and covering at least one connector of the respective trailer. At block 830, the operation involves storing a schedule of times at which the drivers are authorized to access the trailers.

At block 840, the operation involves receiving a communication from a particular apparatus among the apparatuses associated with the trailers, where the communication includes a code input at a code input device of the particular apparatus and a particular time of the code input. At block 850, the operation involves identifying, based on the trailer information, a particular trailer associated with the particular apparatus. At block 860, the operation involves identifying, based on the driver information, a particular driver identified by the code input at the code input device. At block 870, the operation involves communicating an unlock instruction to the particular apparatus based on determining that the particular driver was authorized to access the particular trailer at the particular time based on the schedule. In the manner shown in FIG. 8, the central system may permit the driver to unlock the apparatus to access the trailer's connector(s) and couple them to a vehicle's systems, such as a vehicle's electrical and/or compressed-air systems.

The embodiment of FIG. 8 is merely an example, and variations are contemplated to be within the scope of the present disclosure. For example, in embodiments, instead of blocks 840-860, the operation may involve receiving a communication from a driver's electronic device that authenticates a driver. Then, at block 870, based on the schedule indicating that the authenticated driver is assigned to a trailer, communicating an unlock instruction to the particular apparatus of the trailer. With reference also to FIG. 3, using the operations of FIG. 8, a driver 320 (or another individual authorized to have access) can use an electronic device 310 to request access to the apparatus 120 through the central system 330. The electronic device 310 may communicate with the central system 330 to verify that the user is authorized to access the apparatus 120. If the verification is successful, the central system 330 may send an authorization to the apparatus 120, and the apparatus 120 may unlock. Such and other embodiments are contemplated to be within the scope of the present disclosure.

Accordingly, described are systems, devices, and operations for providing greater security for trailer and providing secure access to trailers. The following will describe various user interfaces and display screens for interacting with the disclosed technology.

In the following descriptions and corresponding figures, the user interfaces may be served by the central system (e.g., 330, FIG. 3) to a display screen of a client device, such as a desktop computer, a laptop computer, a tablet, or a mobile device, among others. The information in the user interface display screen may be stored in storage devices of the central system, such as the storage devices 540 of FIG. 5. In embodiments, a user of the display screens may be personnel of a trucking company which employs drivers and provides transport services to companies and sites to transport goods. In embodiments, a user of the display screens may be personnel of a company or site which has hired drivers to transport their goods. In embodiments, a user of the display screens may be personnel of a company which owns the trailers. Such users and other users and types of users are contemplated to be within the scope of the present disclosure. The user interface display screens described below and shown in the corresponding figures are exemplary, and other configurations of user interfaces different from those described or shown are contemplated to be within the scope of the present disclosure.

Figure 9:
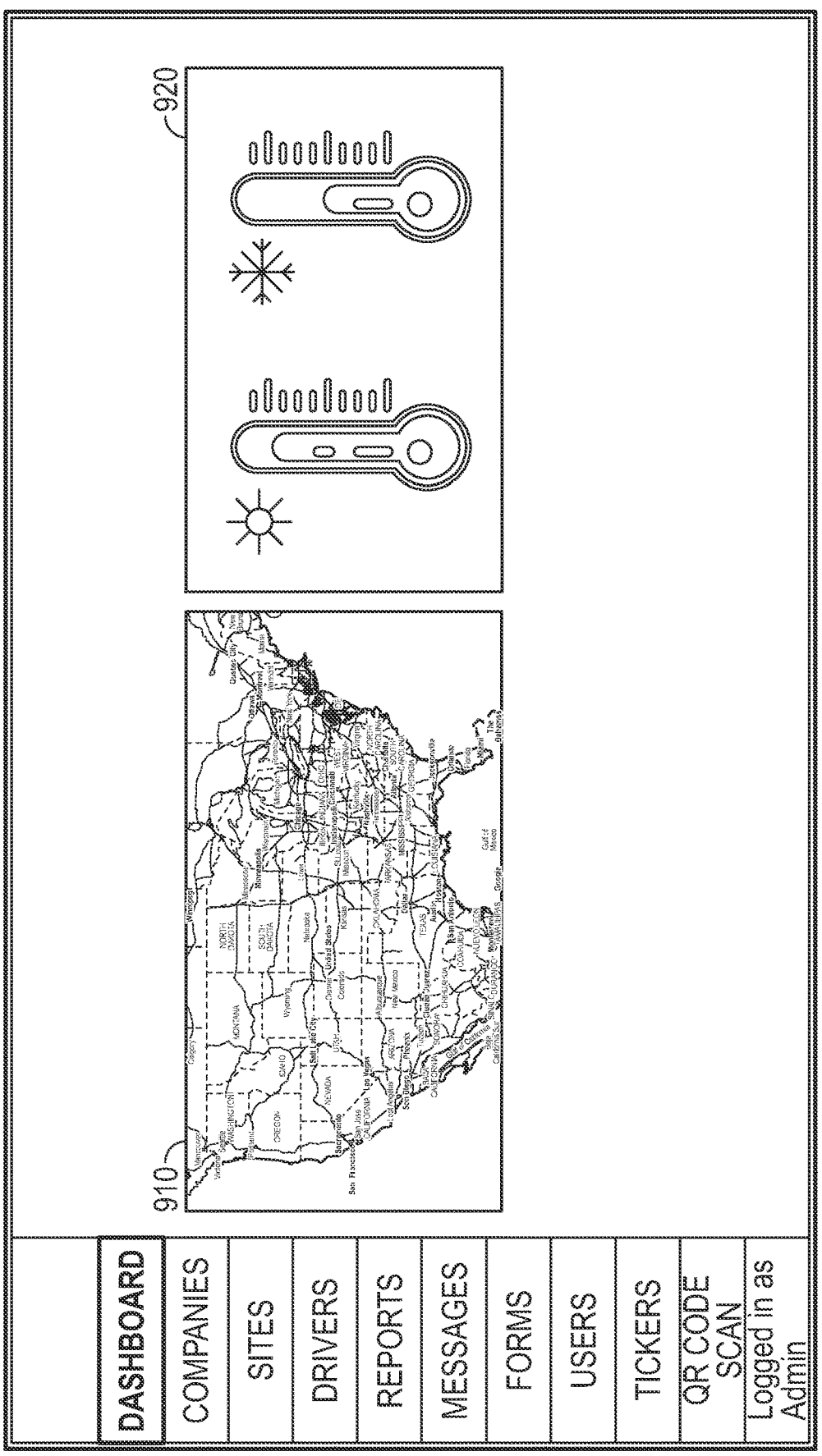
FIG. 9 is a diagram of an exemplary dashboard user interface display screen, in accordance with aspects of the present disclosure.

FIG. 9 is a diagram of an exemplary dashboard user interface display screen. The user interface display screen may be interactive and, in the illustrated embodiment, includes two selections 910, 920. The map selection 910 provides a user interface display screen with a map showing locations of trailers, and the temperature selection 920 provides a user interface display screen with temperature information for trailers. The dashboard may include other selections.

Figure 10:
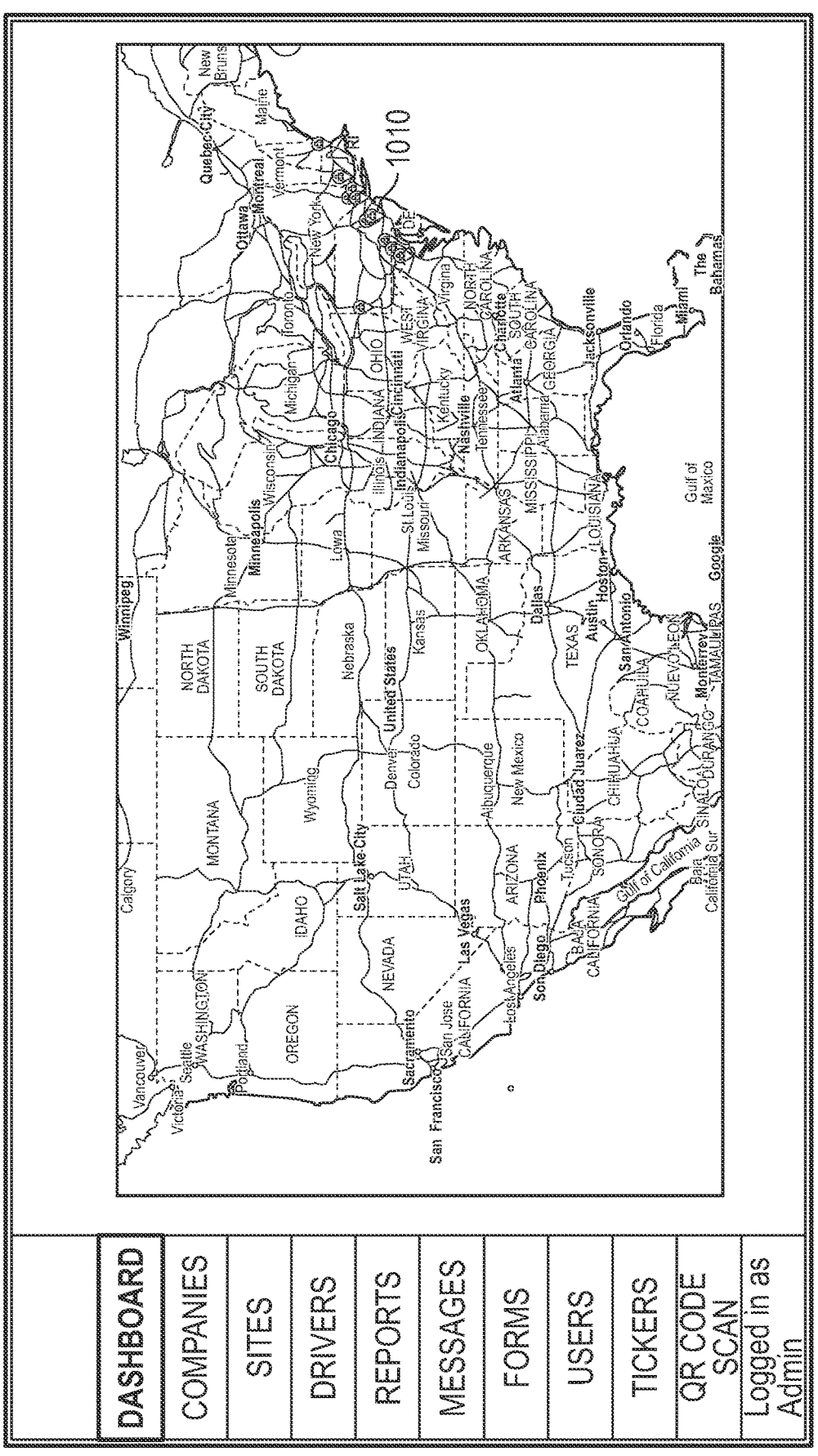
FIG. 10 is a diagram of an exemplary dashboard user interface display screen showing trailer locations, in accordance with aspects of the present disclosure.

FIG. 10 provides an example user interface display screen when the map selection 910 of FIG. 9 is selected. The map displays locations of the trailers 1010 based on GPS location data, such as GPS location data 620 of FIG. 6. The central system may access such GPS location data to generate the display screen of FIG. 10. A user may interact with the map to zoom in or zoom out. In embodiments, when a user selects or hovers a pointer over a trailer location 1010, the user interface display screen may show information about the driver and/or the trailer in a popup window or message box (not shown) on the display screen, such as any of the driver or trailer information described above or below herein.

FIG. 11 provides an example user interface display screen when the temperature selection 920 of FIG. 9 is selected. The user interface displays trailer identifiers, trailer temperatures, and temperature status, based on trailer information and temperature measurements, such as the information and temperature measurements 630 of FIG. 6. The central system may access such data to generate the display screen of FIG. 11. In accordance with aspects of the present disclosure, when a temperature for a trailer is out of an intended range, the central system may alert the driver of the trailer, and the user interface display screen may indicate this status 1110. The central system may alert the driver using, for example, an app installed on the driver's electronic device, an automated voice call to the driver's mobile device, a text message to the driver's mobile device, and/or warning lights or sounds from the apparatus installed on the trailer, such as the apparatus 120 of FIG. 1 and FIG. 3, among other things.

FIG. 12 is a diagram of an exemplary user interface display screen for a companies tab. A user may interact with the user interface display screen to set up company information, company logo, company sites, and/or information for operational workflows for the company, among other things. In embodiments where the user is personnel of a trucking company, the user may interact with the user interface display screen to set up a company client. In embodiments where the user is personnel of a company, the user may interact with the user interface display screen to set up information for the company.

FIG. 13 is a diagram of an exemplary user interface display screen for a sites tab. A user may interact with the user interface display screen to set up information for a site where trailers are located and to register trailers with the central system. In embodiments where the user is personnel of a trucking company, the user may interact with the user interface display screen to set up a site where the trucking company operates. In embodiments where the user is personnel of a company that owns or leases trailers, the user may interact with the user interface display screen to set up information for the site and register trailers with the central system. In embodiments, a user may interact with selections 1310 of the user interface display screen to set information for trailers located at the site, such as trailer information described in connection with FIG. 5 and FIG. 6, and/or information about a destination for the trailer and a deadline by which the trailer is to be delivered to the destination, among other things. In embodiments, a user may interact with the user interface display screen to display information for trailers located at the site, such as trailer information described in connection with FIG. 5 and FIG. 6.

Figure 14:
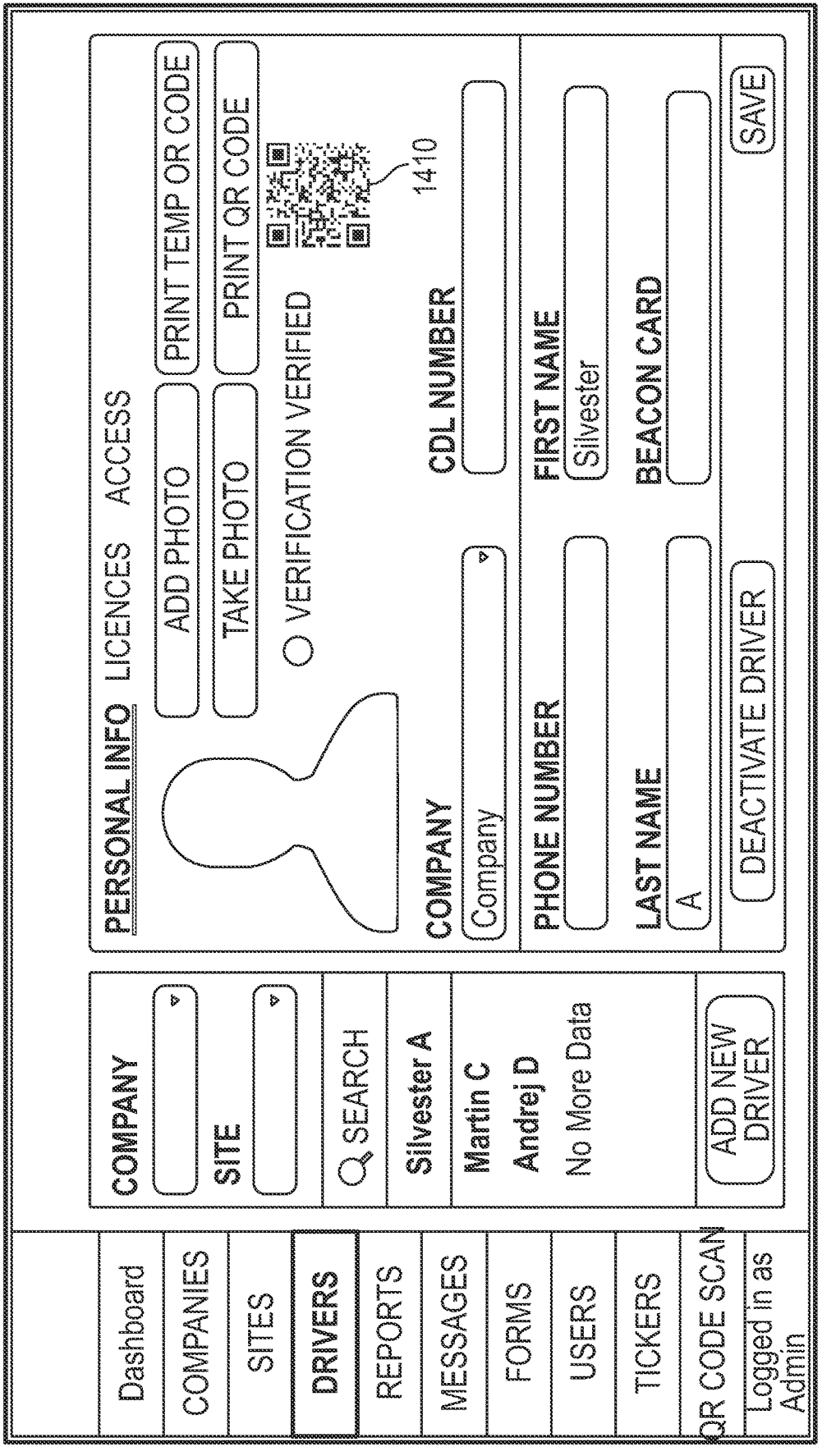
FIG. 14 is a diagram of an exemplary user interface display screen for a drivers tab, in accordance with aspects of the present disclosure.

FIG. 14 is a diagram of an exemplary user interface display screen for a drivers tab. A user may interact with the user interface display screen to set up drivers and register them with the central system and to grant drivers access to trailers. In embodiments where the user is personnel of a trucking company, the user may interact with the user interface display screen to set up a driver and to assign drivers to trailers. In embodiments where the user is personnel of the site, the user may interact with the user interface display screen to view driver information. As described above, the central system may assign each registered driver a QR code 1410 that identifies the driver, and the central system may communicate this QR code to the driver's electronic device.

Figure 15:
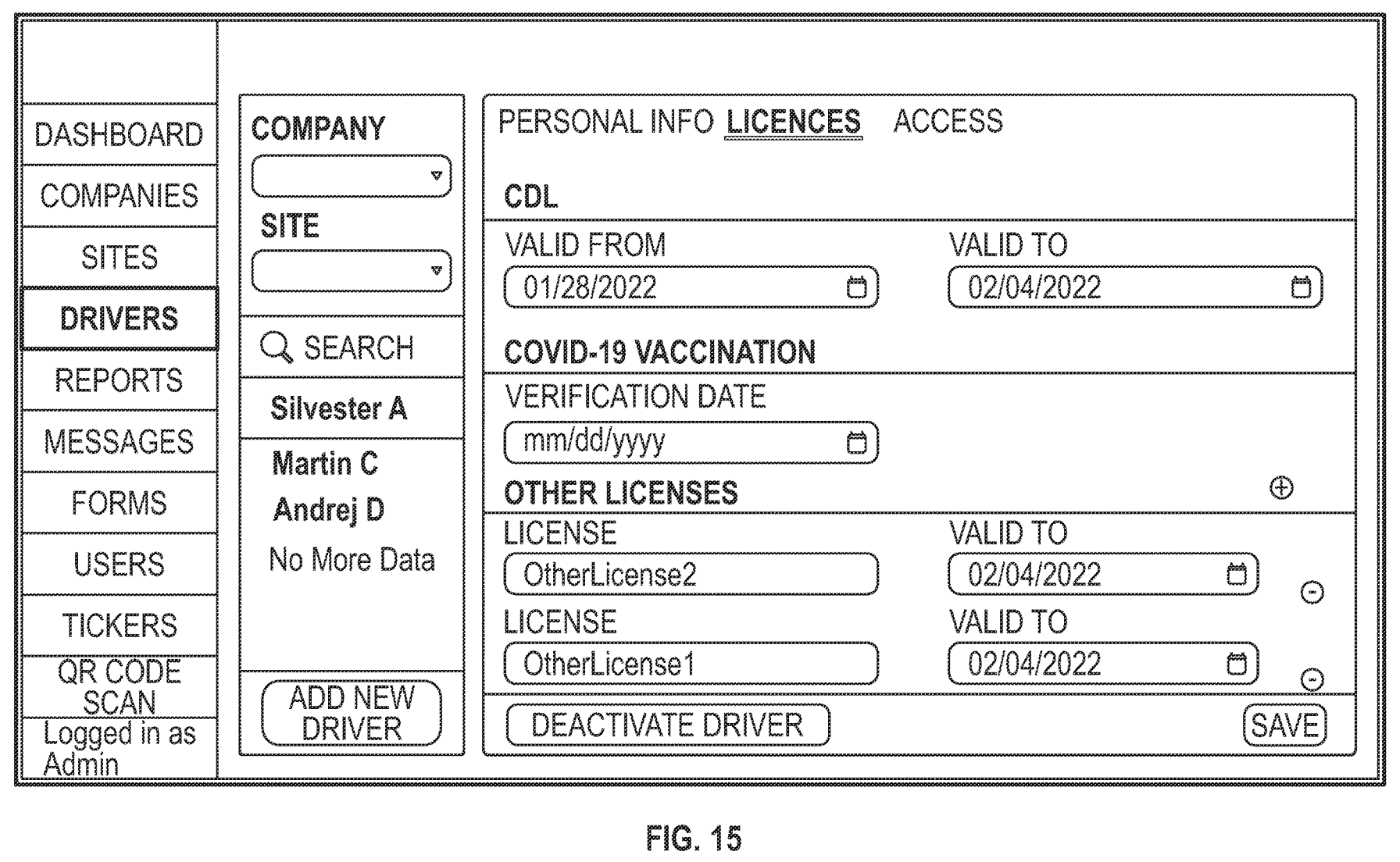
Figure 16:
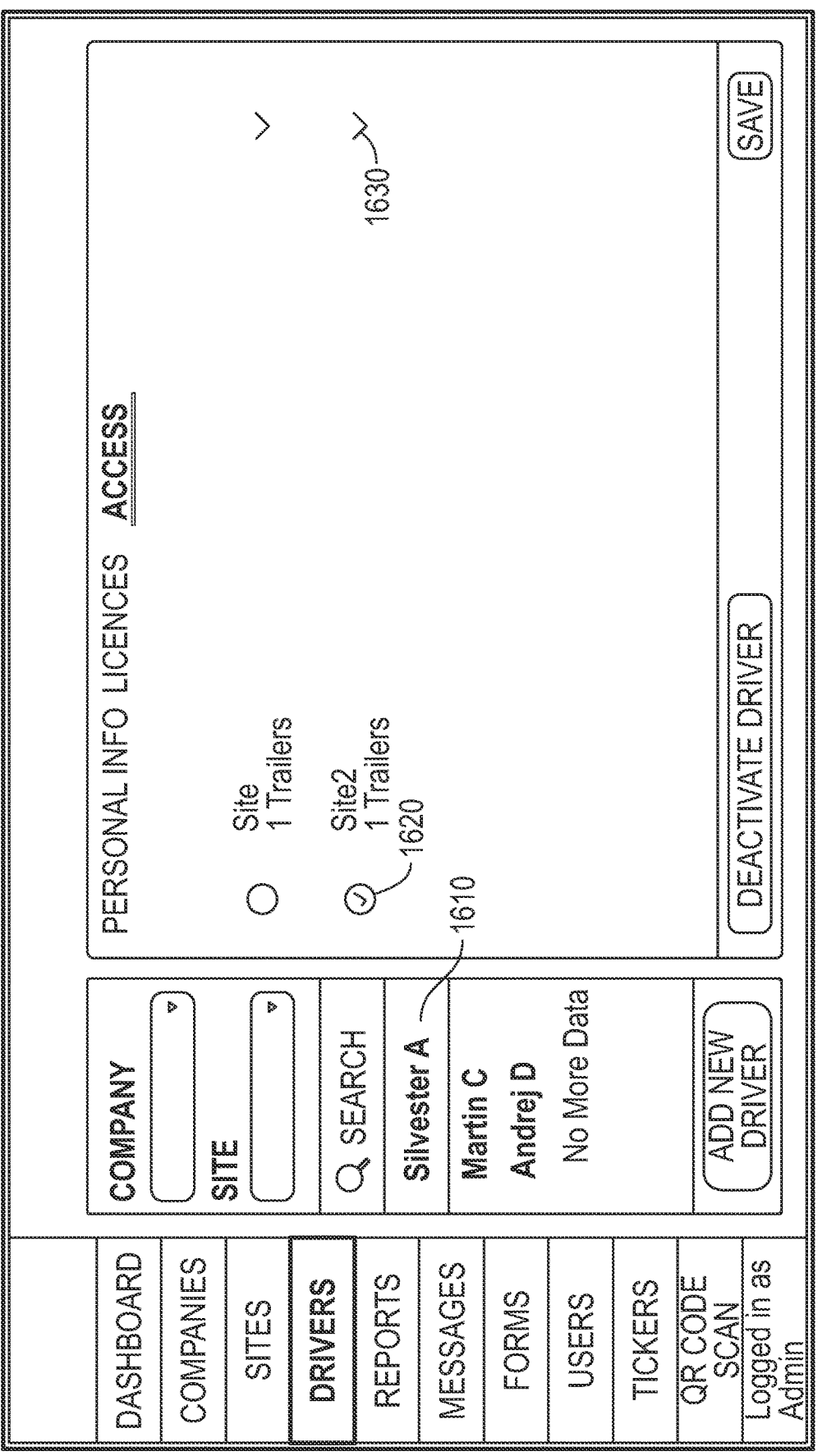
FIG. 16 is a diagram of a yet another exemplary user interface display screen for a drivers tab, in accordance with aspects of the present disclosure.

An example of a user interface for entering driver license information is shown in FIG. 15, and an example of a user interface for assigning drivers to trailers is shown in FIG. 16. In FIG. 16, a user can select a driver 1610 and select a site 1620 where a trailer is located. A pulldown interface 1630 of the user interface may be engaged to show information about the trailers located at the site 1620 and provide user interface options (not shown) for setting dates and times when the driver 1610 is granted access to the trailer.

Figure 17:
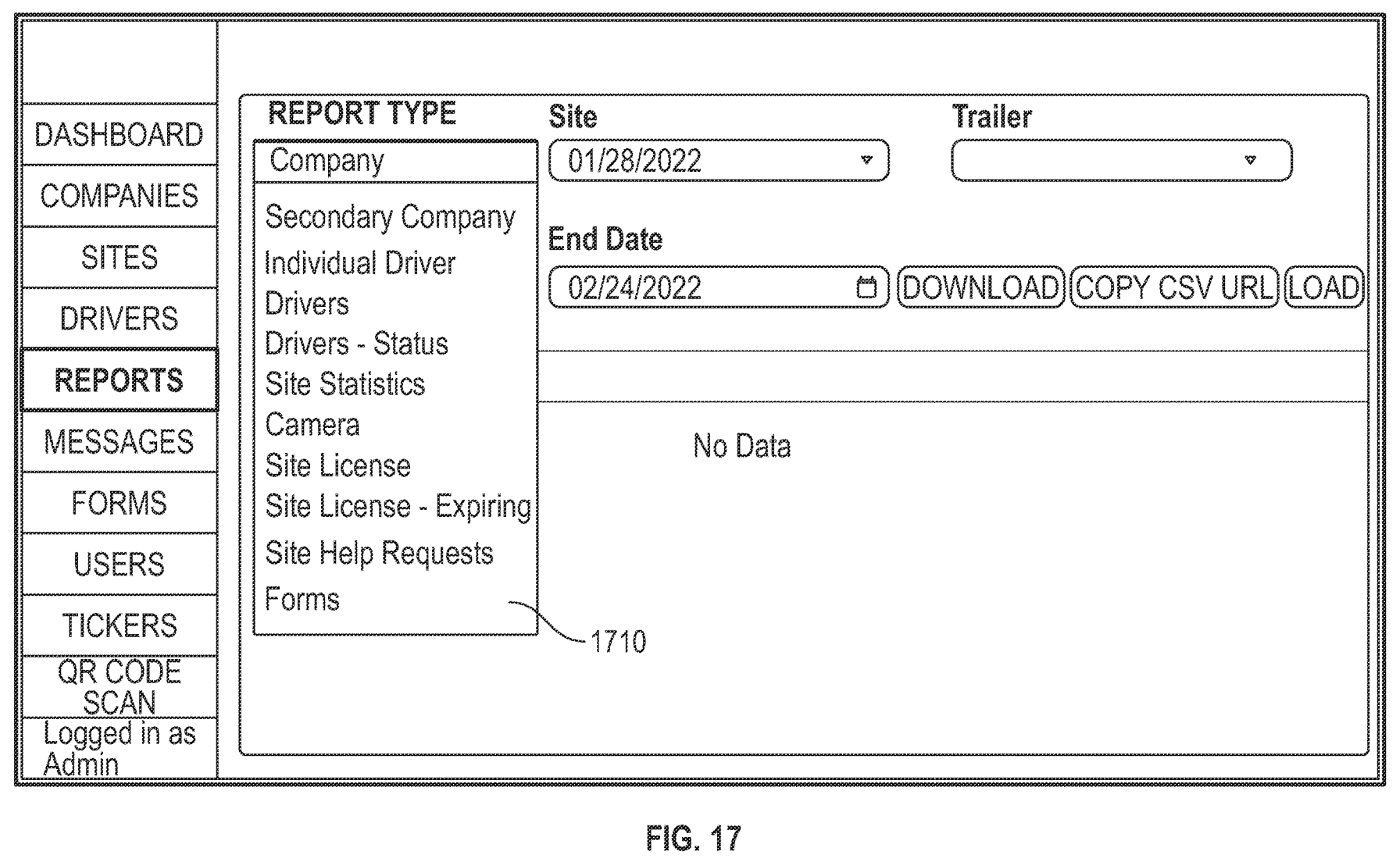

FIG. 17 is a diagram of an exemplary user interface display screen for a reports tab. A user may interact with the user interface display screen to generate reports of various types, such as the types of reports 1710 shown in FIG. 17, i.e., a report on a company, a report on a secondary company, a report on an individual driver, a report on multiple drivers, a report on status of drivers, a report on statistics for a site, a report on security cameras, a report on a site license, a report on expiration of a site license, a report on site help requests, and/or a report on forms, among others. The central system may generate the reports based on information and data stored in the central system, such as the information and data described in connection with FIG. 5 and FIG. 6, among other things.

Figure 18:
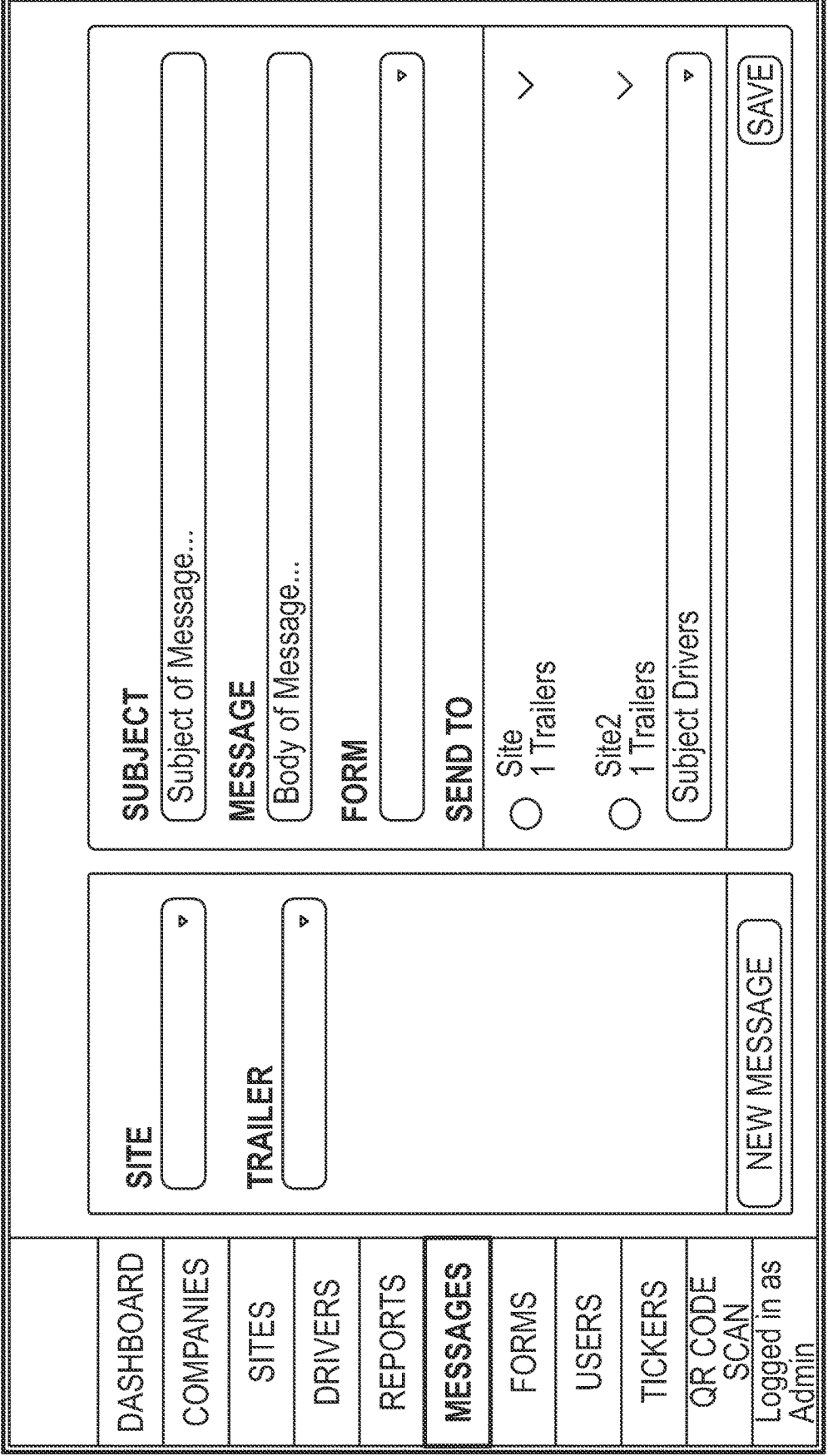
FIG. 18 is a diagram of an exemplary user interface display screen for a messages tab, in accordance with aspects of the present disclosure.

FIG. 18 is a diagram of an exemplary user interface display screen for a messages tab. A user may interact with the user interface display screen to send messages and/or notifications to sites and/or drivers and to view messages from sites and/or drivers. The messages and/or notifications may be sent to an app on a driver's electronic device and/or may be sent by email or text messaging, among other things.

Figure 19:
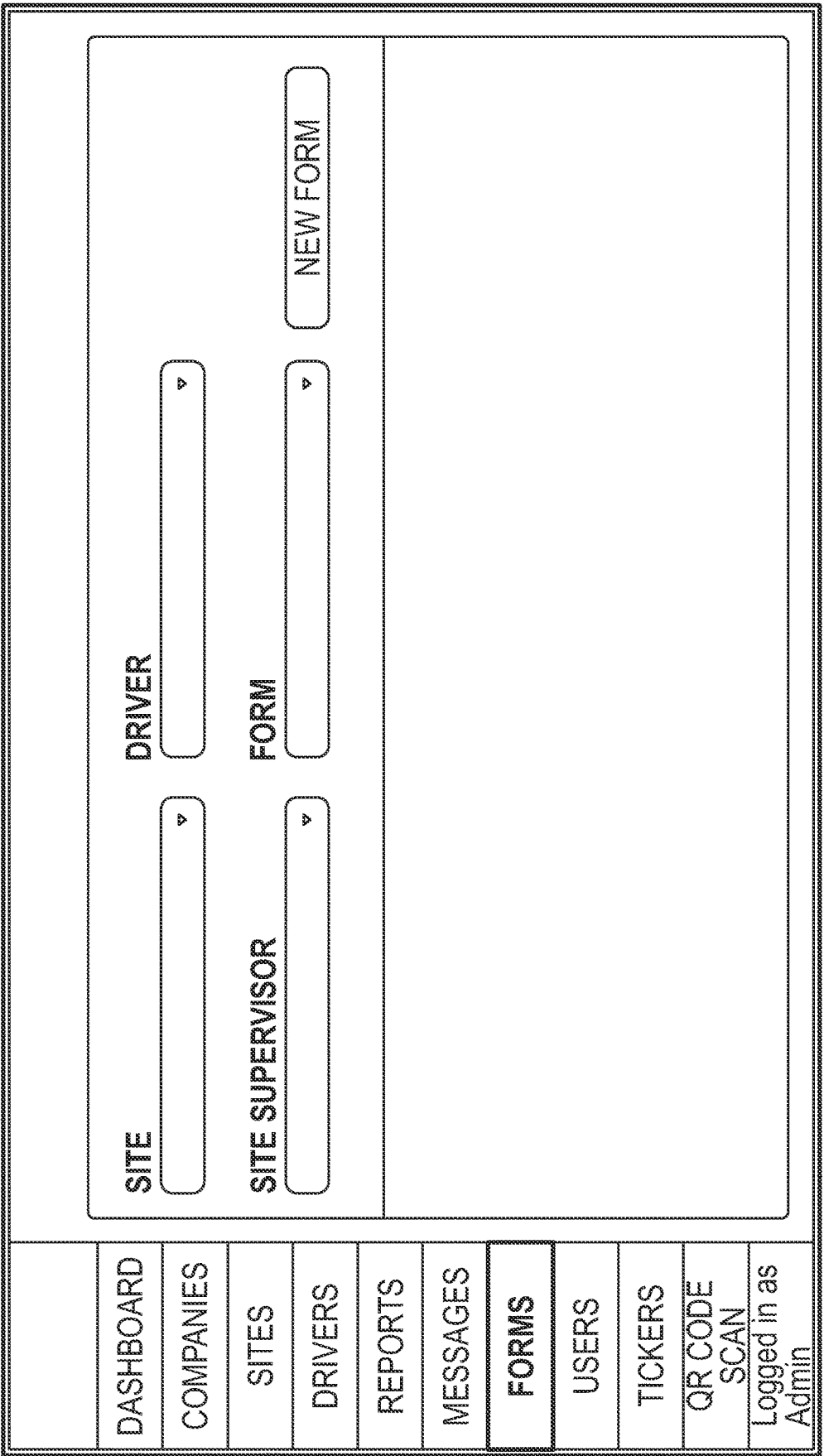
FIG. 19 is a diagram of an exemplary user interface display screen for a forms tab, in accordance with aspects of the present disclosure.

FIG. 19 is a diagram of an exemplary user interface display screen for a forms tab. A user may interact with the user interface display screen to digitize and upload paper forms and fill them out online or to add an electronic form. The user interface display screen may provide user interface options (not shown) for filling out forms, electronically signing forms, and/or uploading completed forms, among other things.

Figure 20:
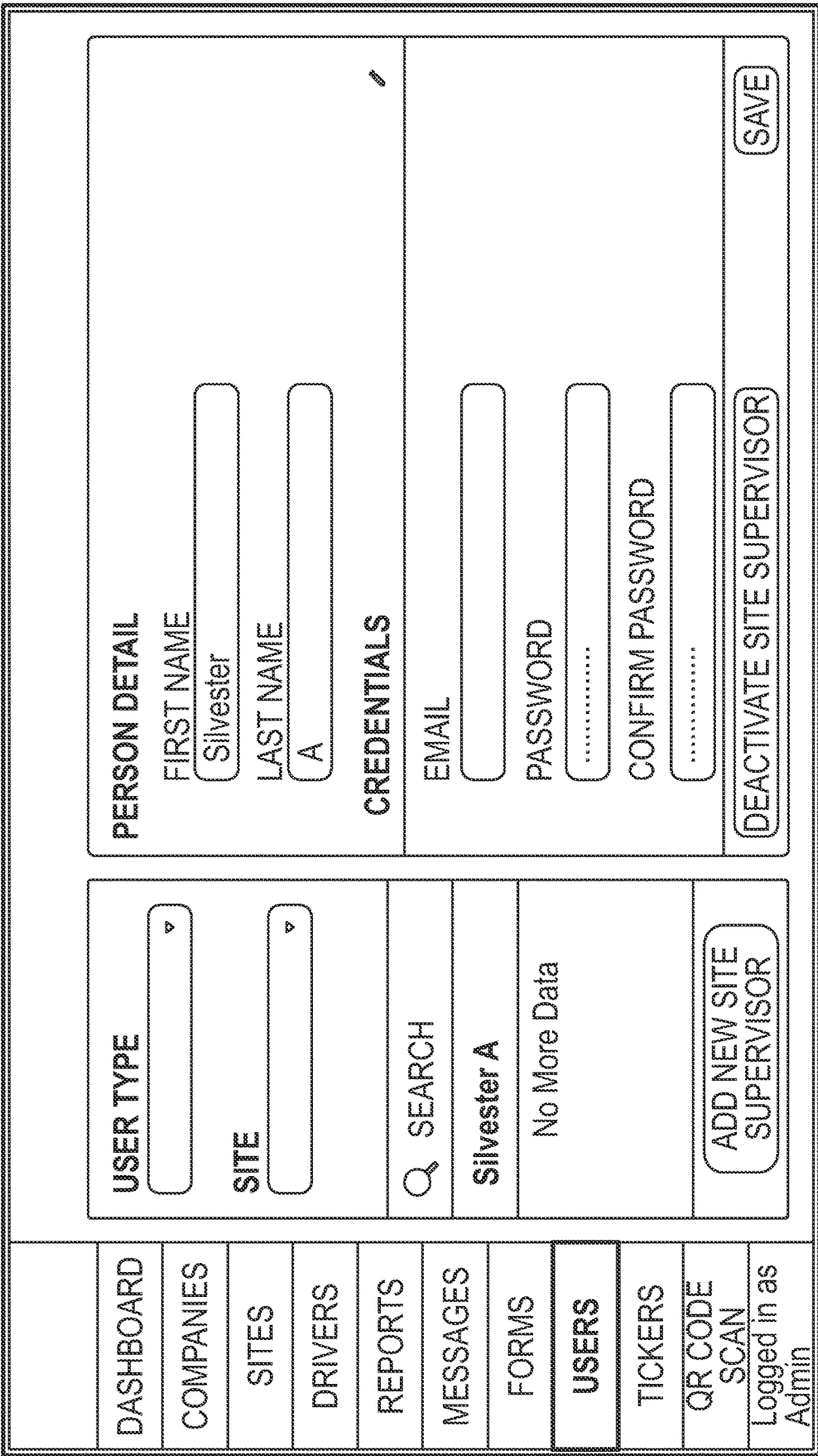
FIG. 20 is a diagram of an exemplary user interface display screen for a users tab, in accordance with aspects of the present disclosure.

FIG. 20 is a diagram of an exemplary user interface display screen for a users tab. A user may interact with the user interface display screen to set up accounts for personnel who are authorized to use the services of the central system, such the services of the user interfaces shown in FIGS. 9-19. The user interface display screen captures identification information, role information, and login credential for new users, among other things.

Figure 21:
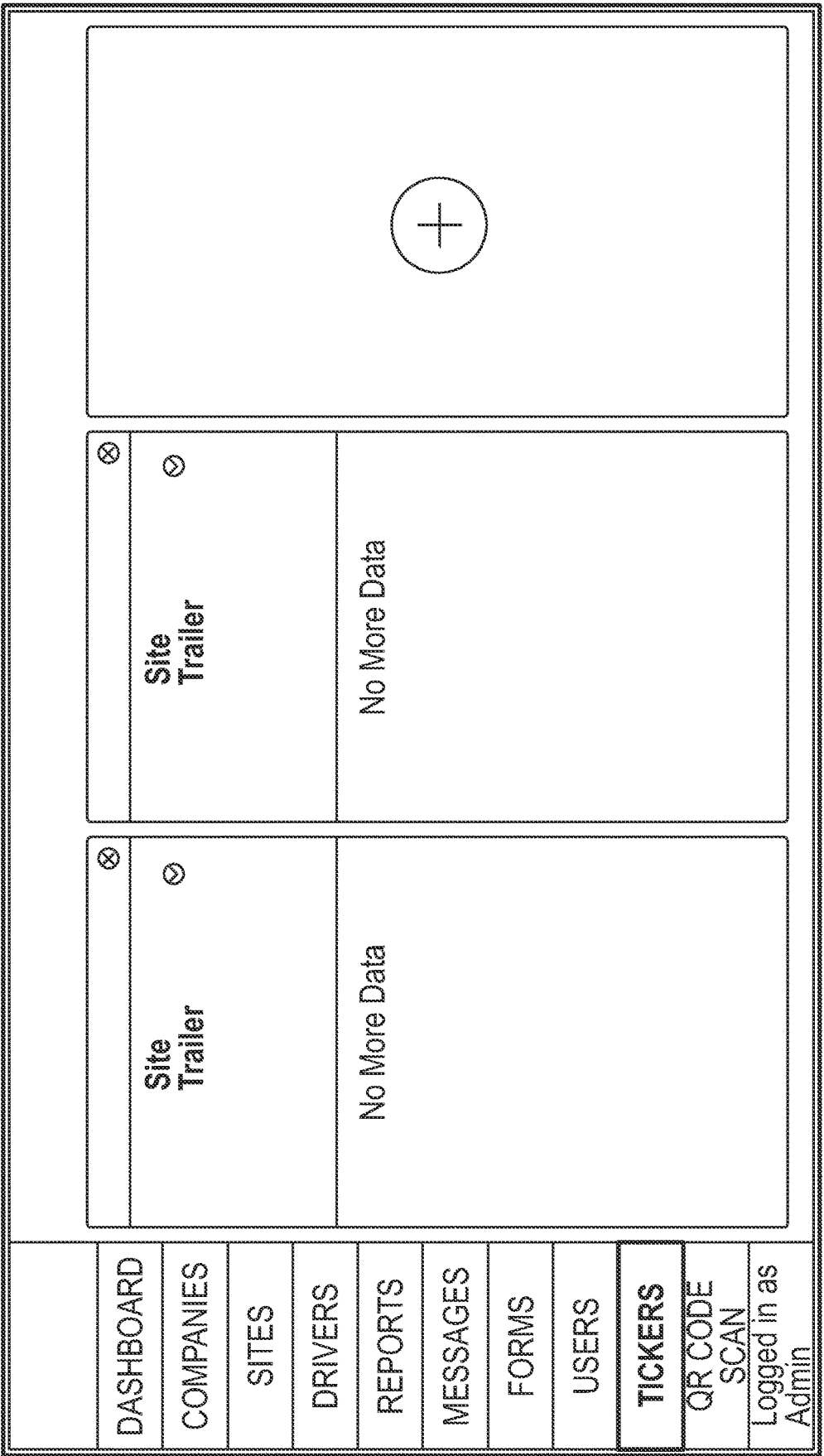
FIG. 21 is a diagram of an exemplary user interface display screen for a tickers tab, in accordance with aspects of the present disclosure.

FIG. 21 is a diagram of an exemplary user interface display screen for a tickers tab. A user may interact with the user interface display screen to view a real-time feed of events for one or more trailers, such as a real-time feed of GPS location and/or temperature measurements, among other things. The central system receives such information from the apparatuses installed on the trailers, and such information may be used to generate the real-time feeds.

Figure 22:
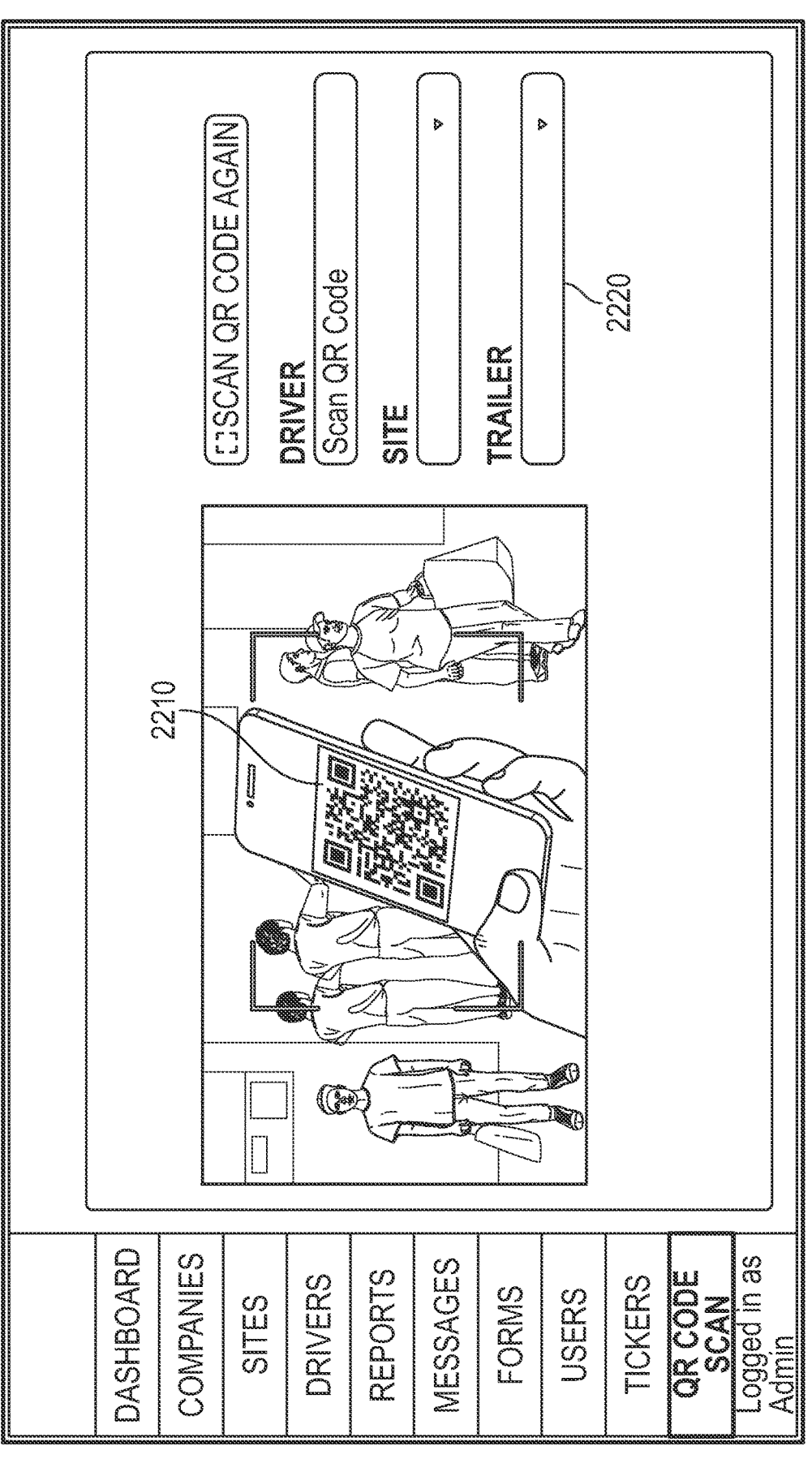
FIG. 22 is a diagram of an exemplary user interface display screen for a QR code scan tab, in accordance with aspects of the present disclosure.

FIG. 22 is a diagram of an exemplary user interface display screen for a QR code scan tab. The user interface display screen may be used in situations where a driver is ready to tow a trailer, but the QR scanner of the apparatus (e.g., 420, FIG. 4) installed on the trailer is non-functional. A site supervisor may load the user interface display screen of FIG. 22 on a mobile device and engage the camera of the mobile device (not shown) to capture the driver's QR code 2210 shown on the driver's electronic device. The site supervisor may interact with the user interface display screen to specify the trailer and/or the site 2220 and submit the QR code 2210 and the specified information 2220 to the central system. The central system may perform various operations of FIG. 8 to determine whether the QR code 2210 includes or is an authorized code. If so, the central system may communicate an unlock instruction to the apparatus installed on the trailer.

Figure 23:
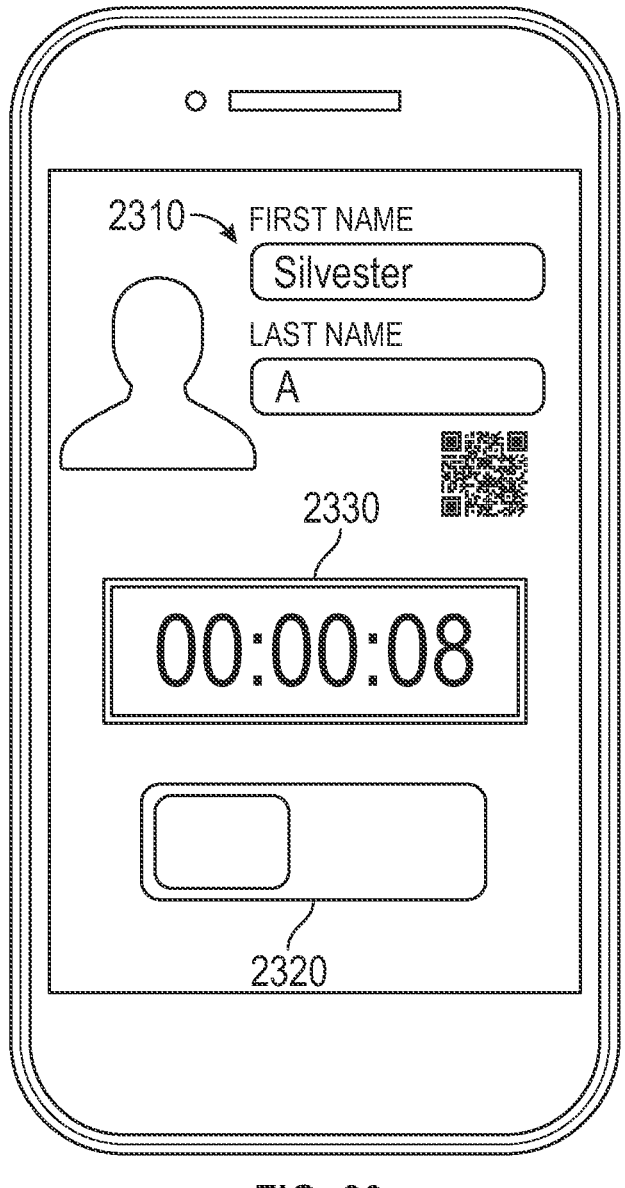
FIG. 23 is a diagram of an exemplary user interface display screen for a driver to log driving time using an electronic device, in accordance with aspects of the present disclosure.

FIG. 23 is a diagram of an exemplary user interface display screen for a driver to log driving time using an electronic device. The user interface display screen may be displayed in a browser or may be a display screen of an app. The user interface display screen displays identifying information 2310 for the driver and includes a toggle user interface element 2320 that the driver can engage to turn on or off a timer. The user interface display screen shows the total time 2330 that the timer has accumulated. In embodiments, the user interface may operate to automatically report the accumulated time 2330 from the driver's electronic device to the central server at regular time intervals. In embodiments, the user interface may include a user interface element (not shown) that allows the driver to manually submit the timer total 2330 to the central system.

Accordingly, various user interface display screen have been described. The user interface display screens are exemplary and configurations and content different from those illustrated may be used. Such and other variations are contemplated to be within the scope of the present disclosure.

While many portions of the present disclosure refer to drivers, it is contemplated that aspects of the present disclosure may be applied to driverless vehicles that operate according to artificial intelligence techniques. In such cases, the driverless vehicle may not have a driver but may still need an operator (human or machine) to couple the trailer's connectors to the vehicle's systems. There may be other situations in which a human operator who is not a driver may seek to access a trailer's connectors to couple them with a vehicle's systems. In accordance with aspects of the present disclosure, any disclosure herein relating to drivers shall be applicable to any operator (human or machine) or person who may not be a driver but who may be authorized to access a trailer's connectors. Accordingly, unless the context indicates otherwise, a reference to "driver" in the present disclosure shall be interchangeable with the word "operator" or "person."

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an embodiment," "in embodiments," "in embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

Any of the herein described operations, methods, programs, algorithms, or codes may be converted to, or expressed in, a programming language or computer program embodied on a computer, processor, or machine-readable medium. The terms "programming language" and "computer program," as used herein, each include any language used to specify instructions to a computer or processor, and include (but is not limited to) the following languages and their derivatives: Assembler, Basic, Batch files, BCPL, C, C+, C++, CSS, Dart, Delphi, Fortran, HTML, Java, JavaScript, Kotlin, machine code, operating system command languages, Pascal, Perl, PL1, Python, React, scripting languages, Swift, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

It should be understood that the foregoing description is only illustrative of the present disclosure. To the extent consistent, any or all of the aspects detailed herein may be used in conjunction with any or all of the other aspects detailed herein. Various alternatives and modifications can be devised by those skilled in the art without departing from the disclosure. Accordingly, the present disclosure is intended to embrace all such alternatives, modifications, and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. An apparatus for providing secure access to a trailer connector, the apparatus comprising:

a cover configured to be secured to a trailer and configured to cover at least one compressed-air connector of the trailer, the trailer configured to be towed by a vehicle and the at least one compressed-air connector of the trailer configured to couple with at least one compressed-air system of the vehicle, wherein the cover has an open position in which the at least one compressed-air connector of the trailer is accessible to form a connection with the at least one compressed-air system of the vehicle and a closed position in which the at least one compressed-air connector of the trailer is inaccessible;

a magnetic or mechanical locking device having a first state and a second state, the first state of the magnetic or mechanical locking device configured to hold the cover in the closed position so the at least one compressed-air connector of the trailer is inaccessible, and the second state of the magnetic or mechanical locking device configured to permit the cover to move from the closed position to the open position so the at least one compressed-air connector of the trailer is accessible to form a connection with the at least one compressed-air system of the vehicle; and a controller communicatively coupled to the magnetic or mechanical locking device, the controller configured to cause the magnetic or mechanical locking device to change from the first state to the second state, to permit the cover to move from the closed position to the open position, based on an authorization, so that the at least one compressed-air connector of the trailer becomes accessible to form a connection with the at least one compressed-air system of the vehicle, wherein the authorization is an electronic authorization.

2. The apparatus of claim 1, wherein the trailer includes an electrical connector configured to couple with an electrical system of the vehicle, the apparatus further comprising:

a battery; and power circuitry coupled to the electrical connector and the battery, wherein the power circuitry causes the battery to be recharged when the electrical connector is coupled to the electrical system of the vehicle.

3. The apparatus of claim 1, further comprising a wireless communication device coupled to the controller, wherein the controller is further configured to communicate with a central system, using the wireless communication device, to receive the authorization from the central system.

4. The apparatus of claim 1, further comprising:

a keypad code input device, wherein the authorization is based on a code input on the keypad code input device being an authorized code.

5. The apparatus of claim 1, further comprising:

a QR reader code input device, wherein the authorization is based on a QR code input to the QR reader code input device being an authorized code.

6. The apparatus of claim 4, wherein the authorized code to be input to the keypad code input device changes over time.

7. The apparatus of claim 3, wherein the wireless communication device comprises a cellular transceiver and a cellular antenna.

8. The apparatus of claim 3, further comprising at least one of: a GPS receiver, or a temperature sensor configured to be positioned within an interior of the trailer, wherein the controller is further configured to:

receive at least one of: a temperature measurement from the temperature sensor, or a geographical coordinate from the GPS receiver, and communicate at least one of: the temperature measurement or the geographical coordinate, to the central system.

9. A method of using an apparatus to provide secure access to at least one compressed-air connector of a trailer, the apparatus comprising a magnetic or mechanical locking device, a controller, and a cover configured to be secured to the trailer and to cover the at least one compressed-air connector of the trailer, the trailer configured to be towed by a vehicle and the at least one compressed-air connector configured to couple with at least one compressed-air system of the vehicle, the cover having an open position in which the at least one compressed-air connector is accessible to form a connection with the at least one compressed-air system of the vehicle and a closed position in which the at least one compressed-air connector of the trailer is inaccessible, the method comprising:

receiving an authorization; and causing, by the controller, and based on the authorization, the magnetic or mechanical locking device to change from a first state to a second state, wherein the first state of the magnetic or mechanical locking device is configured to hold the cover in the closed position so the at least one compressed-air connector of the trailer is inaccessible, and the second state of the magnetic or mechanical locking device is configured to permit the cover to move from the closed position to the open position so the at least one compressed-air connector of the trailer is accessible to form a connection with the at least one compressed-air system of the vehicle.

10. The method of claim 9, wherein the trailer includes an electrical connector and the apparatus further comprises a battery and power circuitry coupled to the electrical connector and the battery, the method further comprising:

causing, by the power circuitry, the battery to recharge when the electrical connector is coupled to an electrical system of the vehicle.

11. The method of claim 9, wherein the apparatus further comprises a wireless communication device coupled to the controller, the method further comprising:

communicating with a central system, using the wireless communication device, to receive the authorization from the central system.

12. The method of claim 9, wherein the apparatus further comprises a keypad code input device, and wherein the authorization is based on a code input on the keypad code input device being an authorized code.

13. The method of claim 9, wherein the apparatus further comprises a QR reader code input device, and wherein the authorization is based on a QR code input to the QR reader code input device being an authorized code.

14. The method of claim 12, wherein the authorized code to be input to the keypad code input device changes over time.

15. The method of claim 11, wherein the wireless communication device comprises a cellular transceiver and a cellular antenna.

16. The method of claim 11, wherein the apparatus further comprises at least one of: a GPS receiver, or a temperature sensor configured to be positioned within an interior of the trailer, the method further comprising, by the controller:

receiving at least one of: a temperature measurement from the temperature sensor, or a geographical coordinate from the GPS receiver; and communicating at least one of: the temperature measurement or the geographical coordinate, to the central system.

17. A system for providing secure access to trailers, the system comprising:

a communication device;

a storage device storing:

driver information on a plurality of drivers, trailer information on a plurality of trailers, the trailer information comprising, for each trailer of the plurality of trailers, information on an apparatus associated with the respective trailer and covering at least one compressed-air connector of the respective trailer, each apparatus comprising: a magnetic or mechanical locking device and wireless communication capability, and a schedule of times at which drivers of the plurality of drivers are authorized to access trailers of the plurality of trailers;

at least one processor; and at least one memory storing instructions which, when executed by the at least one processor, cause the system to, without human intervention:

receive, via the communication device, a communication from an electronic device of a driver, the communication comprising authentication information for the driver;

identify, based on the driver information, a particular driver identified by the authentication information for the driver; and based on determining that the particular driver is authorized to access a particular trailer based on the schedule, communicate, via the communication device, at least one of:

an authorization to the respective apparatus of the particular trailer, the authorization configured to unlock the magnetic or mechanical locking device of the respective apparatus and provide the particular driver with access to the at least one compressed-air connector of the particular trailer to form a connection with at least one compressed-air system of a vehicle, or an authorized code to the electronic device of the driver, the authorized code configured to be input by the driver to a code input device of the respective apparatus of the particular trailer.

18. The system of claim 17, wherein the code input device is a keypad code input device.

19. The system of claim 17, wherein the authorized code to be input to the code input device changes over time.

\* \* \* \* \*